(12) United States Patent  (10) Patent No.: US 9,148,907 B2
Cohen et al.  (45) Date of Patent: Sep. 29, 2015

(54) HEADING-DEPENDENT ROUTING

(75) Inventors: Alexander J. Cohen, Mill Valley, CA (US); Edward K. Y. Jung, Bellevue, WA (US); Robert W. Lord, Seattle, WA (US); John D. Rinaldo, Jr., Bellevue, WA (US); Clarence T. Tegreene, Bellevue, WA (US); Royce A. Levien, Lexington, MA (US); Mark A. Malamud, Seattle, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1234 days.

(21) Appl. No.: 11/221,421

(22) Filed: Sep. 7, 2005

(65) Prior Publication Data

US 2007/0054674 A1  Mar. 8, 2007

Related U.S. Application Data

(63) Continuation-in-part of application No. 11/221,396, filed on Sep. 7, 2005.

(51) Int. Cl.
*H04W 16/00* (2009.01)
*H04W 28/26* (2009.01)
*H04W 88/04* (2009.01)
*H04L 29/08* (2006.01)
*H04W 40/20* (2009.01)
*H04W 64/00* (2009.01)

(52) U.S. Cl.
CPC .............. *H04W 88/04* (2013.01); *H04L 67/12* (2013.01); *H04L 67/327* (2013.01); *H04W 16/00* (2013.01); *H04W 28/26* (2013.01); *H04W 40/20* (2013.01); *H04W 64/00* (2013.01)

(58) Field of Classification Search
CPC ..... H04W 16/00; H04W 28/26; H04W 40/20; H04W 88/04; H04L 67/327
USPC .................. 455/456.1, 436, 115.3, 115.4, 41; 370/231, 328, 351; 342/118, 357.01, 342/104; 709/201
See application file for complete search history.

(56) References Cited

U.S. PATENT DOCUMENTS

| | | | |
|---|---|---|---|
| 5,396,429 A * | 3/1995 | Hanchett | 701/117 |
| 5,862,451 A | 1/1999 | Grau et al. | |
| 5,956,644 A | 9/1999 | Miller et al. | |
| 6,125,278 A | 9/2000 | Wieczorek et al. | |
| 6,484,032 B1 * | 11/2002 | Okada | 455/456.1 |
| 6,678,341 B1 | 1/2004 | Miyake et al. | |
| 6,721,572 B1 | 4/2004 | Smith et al. | |
| 6,754,188 B1 * | 6/2004 | Garahi et al. | 370/328 |

(Continued)

FOREIGN PATENT DOCUMENTS

| | | |
|---|---|---|
| DE | 19733586 C1 | 2/1999 |
| DE | 19849294 A1 | 4/2000 |
| WO | WO 99/46899 | 9/1999 |

OTHER PUBLICATIONS

U.S. Appl. No. 11/221,396, Cohen et al.

(Continued)

*Primary Examiner* — Ariel Balaoing

(57) ABSTRACT

Apparatuses, methods and systems are described that are configured to act on a heading-dependent suitability indicator of a channel through a mobile communication system that can have a defined heading, such as a passenger vehicle or other motor-propelled vehicle. The indicator may also use other determinants such as a latitude and longitude of the system.

38 Claims, 17 Drawing Sheets

(56) References Cited

U.S. PATENT DOCUMENTS

| | | |
|---|---|---|
| 7,463,890 B2 | 12/2008 | Herz et al. |
| 2001/0022558 A1 | 9/2001 | Karr, Jr. et al. |
| 2001/0048689 A1* | 12/2001 | Bennett et al. ............. 370/412 |
| 2001/0054060 A1* | 12/2001 | Fillebrown et al. ........... 709/201 |
| 2002/0009971 A1 | 1/2002 | Spratt |
| 2002/0024935 A1 | 2/2002 | Furukawa et al. |
| 2002/0061744 A1 | 5/2002 | Hamalainen et al. |
| 2002/0075941 A1 | 6/2002 | Souissi et al. |
| 2002/0077151 A1 | 6/2002 | Matthews et al. |
| 2002/0122410 A1 | 9/2002 | Kulikov et al. |
| 2002/0176396 A1 | 11/2002 | Hammel et al. |
| 2002/0198005 A1 | 12/2002 | Hilton et al. |
| 2003/0007473 A1 | 1/2003 | Strong et al. |
| 2003/0033394 A1 | 2/2003 | Stine |
| 2003/0046022 A1* | 3/2003 | Silverman .................... 702/150 |
| 2003/0072306 A1 | 4/2003 | Hunzinger |
| 2003/0100317 A1 | 5/2003 | Kaplan et al. |
| 2003/0125067 A1 | 7/2003 | Takeda et al. |
| 2003/0146871 A1 | 8/2003 | Karr et al. |
| 2003/0156058 A1 | 8/2003 | Edwards et al. |
| 2003/0199275 A1 | 10/2003 | Sakoda et al. |
| 2003/0224840 A1 | 12/2003 | Frank et al. |
| 2003/0229900 A1 | 12/2003 | Reisman |
| 2004/0058678 A1* | 3/2004 | deTorbal ...................... 455/437 |
| 2004/0093426 A1 | 5/2004 | Sahasrabudhe et al. |
| 2004/0124977 A1 | 7/2004 | Biffar |
| 2004/0125776 A1 | 7/2004 | Haugli et al. |
| 2004/0157549 A1* | 8/2004 | Dold et al. .................... 455/7 |
| 2004/0157613 A1 | 8/2004 | Steer et al. |
| 2004/0192353 A1 | 9/2004 | Mason et al. |
| 2004/0196834 A1 | 10/2004 | Ofek et al. |
| 2004/0198426 A1 | 10/2004 | Squibbs et al. |
| 2004/0203380 A1 | 10/2004 | Hamdi et al. |
| 2004/0203718 A1 | 10/2004 | Knauerhase et al. |
| 2004/0203779 A1 | 10/2004 | Gabara |
| 2004/0203855 A1 | 10/2004 | Veerasamy et al. |
| 2004/0213181 A1 | 10/2004 | Grech et al. |
| 2004/0218605 A1 | 11/2004 | Gustafsson et al. |
| 2004/0233840 A1 | 11/2004 | Bye |
| 2004/0233855 A1 | 11/2004 | Gutierrez et al. |
| 2004/0233918 A1 | 11/2004 | Larsson et al. |
| 2004/0246144 A1 | 12/2004 | Siegel et al. |
| 2004/0246895 A1* | 12/2004 | Feyerabend ................. 370/229 |
| 2004/0246904 A1 | 12/2004 | Zhang et al. |
| 2004/0266457 A1 | 12/2004 | Dupray |
| 2005/0075119 A1 | 4/2005 | Sheha et al. |
| 2005/0088318 A1 | 4/2005 | Liu et al. |
| 2005/0128995 A1 | 6/2005 | Ott et al. |
| 2005/0143005 A1 | 6/2005 | Moore, III |
| 2005/0169238 A1 | 8/2005 | Yang et al. |
| 2005/0180338 A1* | 8/2005 | Pirila et al. .................... 370/252 |
| 2005/0190717 A1 | 9/2005 | Shu et al. |
| 2005/0192056 A1 | 9/2005 | Karaki |
| 2005/0227624 A1 | 10/2005 | Hiddink et al. |
| 2006/0025106 A1* | 2/2006 | Byers et al. ............... 455/404.2 |
| 2006/0030333 A1 | 2/2006 | Ward et al. |
| 2006/0062175 A1* | 3/2006 | Ling et al. ..................... 370/328 |
| 2006/0072505 A1 | 4/2006 | Carrillo et al. |
| 2006/0105781 A1 | 5/2006 | Ueda et al. |
| 2006/0268797 A1 | 11/2006 | Cheng et al. |
| 2007/0197230 A1 | 8/2007 | Roggero et al. |
| 2007/0271029 A1 | 11/2007 | Tzamaloukas |

OTHER PUBLICATIONS

Aloi, Daniel N.; Dessert, Patrick E.; Willer, Mike; Fay, Luke; Ronning, Matt; "GPS Car Talk"; GPS World; Sep. 1, 2003; pp. 1-7; with additional figures and tables pp. 1-4; located at: http://www.gpsworld.com/gpsworld/article/articleDetail.jsp?id=68463; printed on Sep. 1, 2005.

Ko, Young-Bae; Vaidya, Nitin H.; "Location-Aided Routing (LAR) in mobile ad hoc networks"; Wireless Networks; 2000; vol. 6; pp. 307-321; J.C. Baltzer AG, Science Publishers.

* cited by examiner

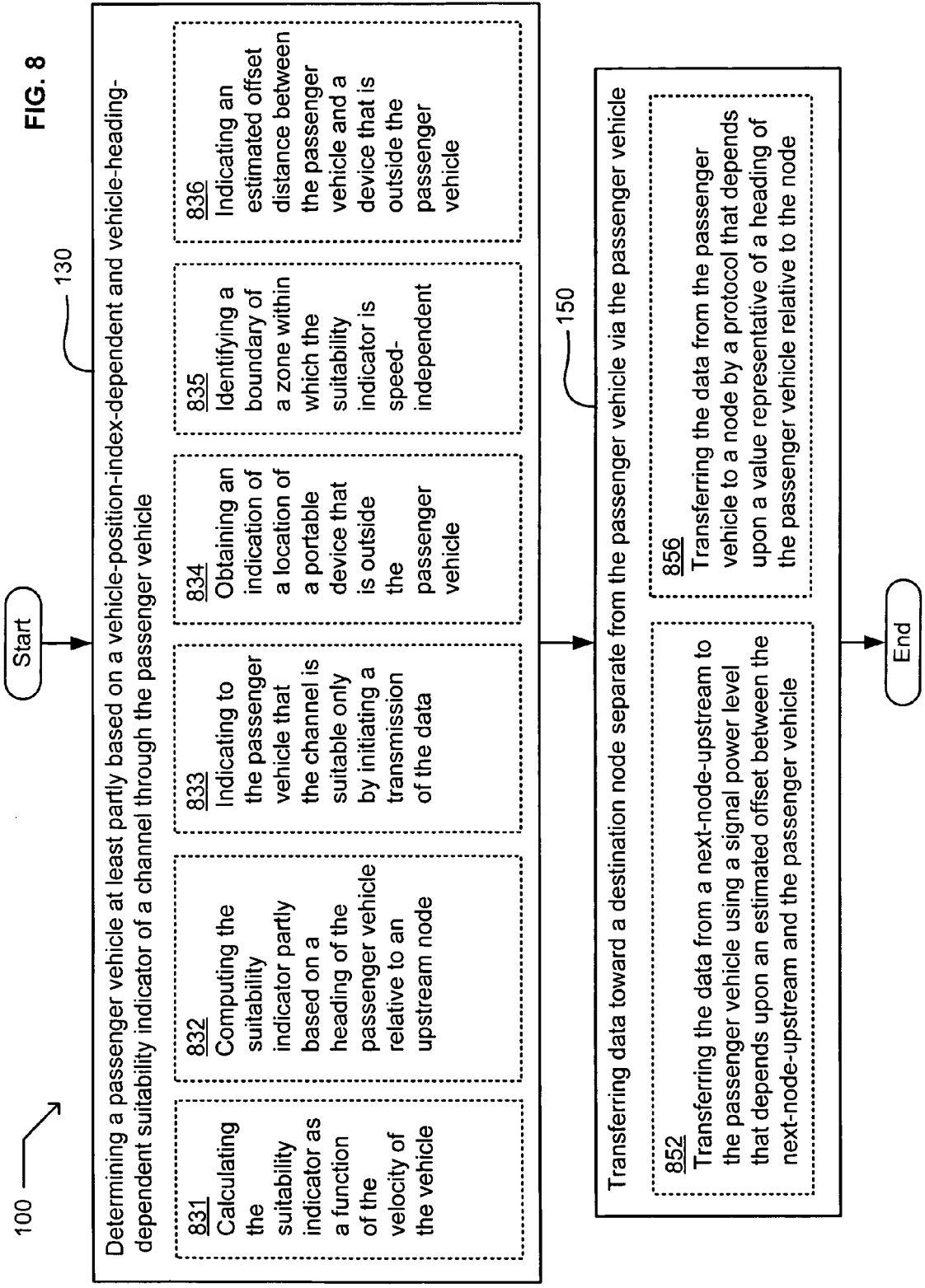

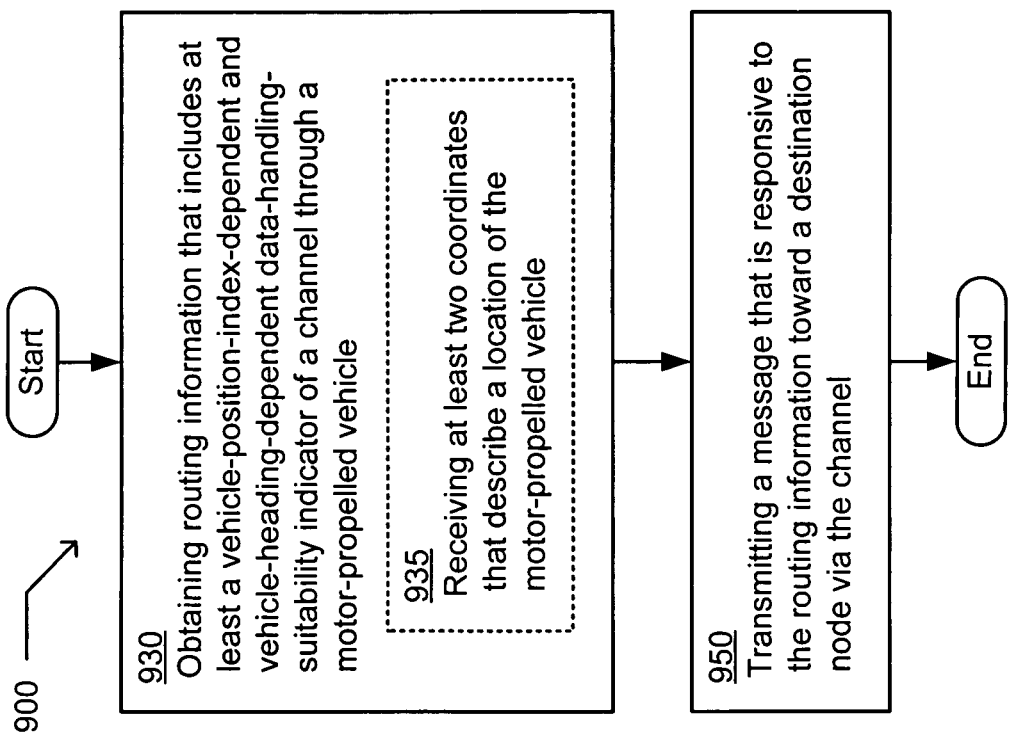

930 Obtaining routing information that includes at least a vehicle-position-index-dependent and vehicle-heading-dependent data-handling-suitability indicator of a channel through a motor-propelled vehicle 935 Receiving at least two coordinates that describe a location of the motor-propelled vehicle 950 Transmitting a message that is responsive to the routing information toward a destination node via the channel

| | Suitability for X=1 | Suitability for X=2 | Suitability for X=3 |
|---|---|---|---|
| Heading = 0 (Moving Toward) | 11 | 11 | 00 |
| Heading = 1 (Not Moving Toward) | 10 | 01 | 00 |

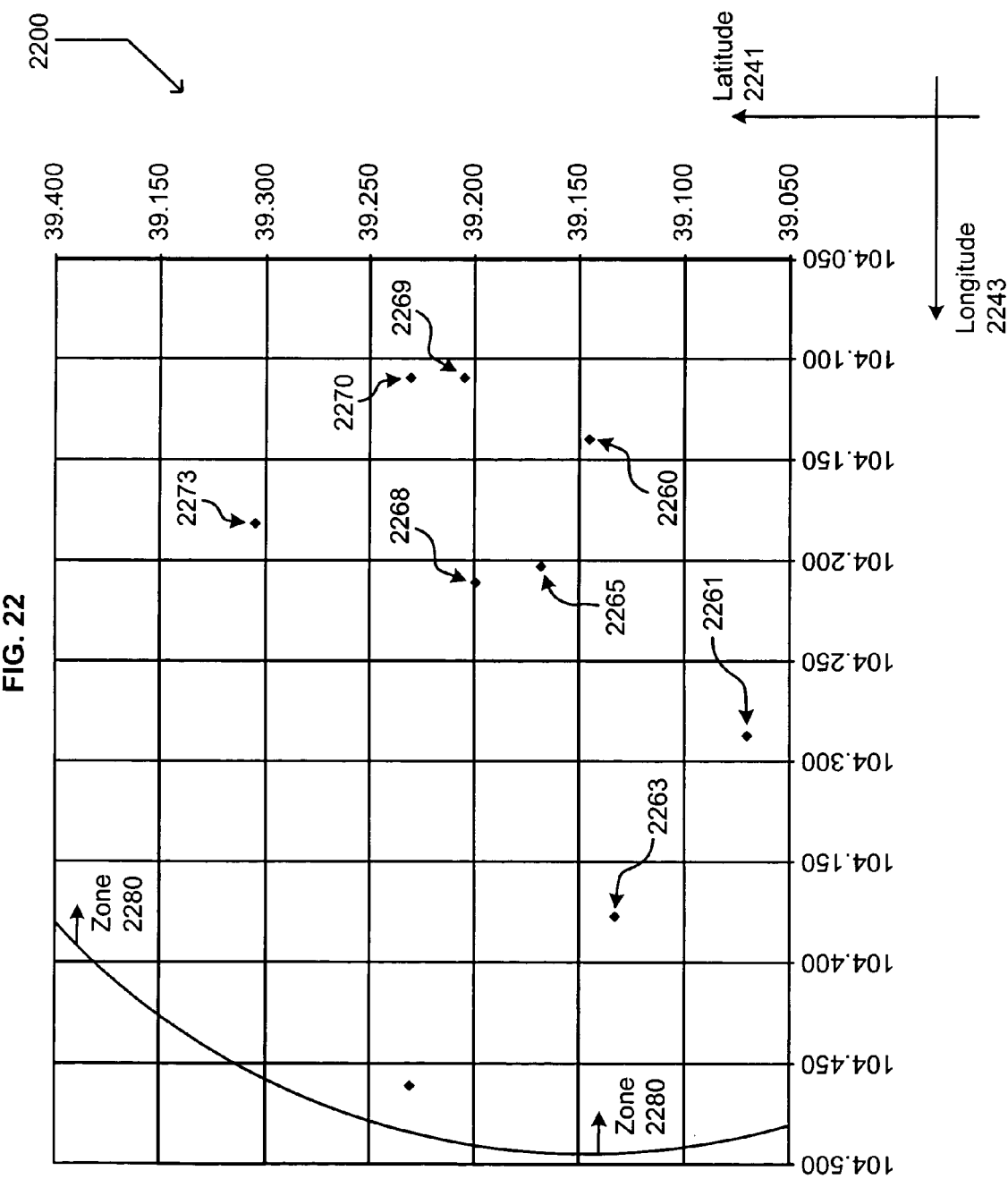

HEADING-DEPENDENT ROUTING

RELATED APPLICATIONS

For purposes of the USPTO extra-statutory requirements, the present application constitutes a continuation in part of currently co-pending United States patent application entitled HEADING-DEPENDENT ROUTING METHOD AND NETWORK SUBSYSTEM, naming Alexander J. Cohen; Edward K. Y. Jung; Robert W. Lord; John D. Rinaldo, Jr.; and Clarence T. Tegreene as inventors, U.S. application Ser. No. 11/221,396, filed Sep. 7, 2005 contemporaneously herewith.

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent and Trademark Office (USPTO) has published a notice to the effect that the USPTO's computer programs require that patent applicants both reference a serial number and indicate whether an application is a continuation or continuation in part. Stephen G. Kunin, Benefit of Prior-Filed Application, USPTO Electronic Official Gazette, Mar. 18, 2003 available on the USPTO website at www.uspto.gov/web/offices/com/sol/og/2003/week11/patbene.htm. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

SUMMARY

One embodiment is a communication method. In one implementation, the method includes determining a passenger vehicle at least partly based on a vehicle-position-index-dependent and vehicle-heading-dependent suitability indicator of a channel through the passenger vehicle. The implementation further includes transferring data toward a destination node separate from the passenger vehicle via the passenger vehicle. In addition to the foregoing, other communication method aspects are described in the claims, drawings, and text forming a part of the present disclosure.

Another embodiment is a network subsystem. In one implementation, the network subsystem includes circuitry for determining a passenger vehicle at least partly based on a vehicle-position-index-dependent and vehicle-heading-dependent suitability indicator of a channel through the passenger vehicle. The implementation further includes circuitry for transferring data toward a destination node separate from the passenger vehicle via the passenger vehicle. In addition to the foregoing, other network subsystem aspects are described in the claims, drawings, and text forming a part of the present disclosure.

Another embodiment is another communication method. In one implementation, the method includes obtaining routing information that includes at least a vehicle-position-index-dependent and vehicle-heading-dependent data-handling-suitability indicator of a channel through a motor-propelled vehicle. The implementation further includes at least transmitting a message that is responsive to the routing information toward a destination node via the channel. In addition to the foregoing, other communication method aspects are described in the claims, drawings, and text forming a part of the present disclosure.

Another embodiment is another network subsystem. In one implementation, the network subsystem includes circuitry for determining a passenger vehicle at least partly based on a vehicle-position-index-dependent and vehicle-heading-dependent suitability indicator of a channel through the passenger vehicle. The implementation further includes circuitry for transferring data toward a destination node separate from the passenger vehicle via the passenger vehicle. In addition to the foregoing, other network subsystem aspects are described in the claims, drawings, and text forming a part of the present disclosure.

Another embodiment is a vehicle. In one implementation, the vehicle includes a communication system operable to respond to a vehicle-position-index-dependent and vehicle-heading-dependent suitability indicator of a signal channel through the communication system by relaying data. The implementation further includes a drive mechanism operable to start the vehicle moving and a power source operable to provide power selectively to the communication system or to the drive mechanism. In addition to the foregoing, other vehicle aspects are described in the claims, drawings, and text forming a part of the present disclosure.

Another embodiment is a network subsystem. In one implementation, the subsystem includes routing circuitry operable to route data beyond a passenger vehicle at least partly based on a vehicle-position-index-dependent and vehicle-heading-dependent suitability indicator of a signal channel that includes the passenger vehicle. In addition to the foregoing, other network subsystem aspects are described in the claims, drawings, and text forming a part of the present disclosure.

Another embodiment is also a network subsystem. In one implementation, the subsystem includes a passenger vehicle that relays data responsive to a vehicle-position-index-dependent and vehicle-heading-dependent suitability indicator of a channel that includes the passenger vehicle. In addition to the foregoing, other network subsystem aspects are described in the claims, drawings, and text forming a part of the present disclosure.

Another embodiment is also a network subsystem. In one implementation, the subsystem includes a device-readable medium that guides data along a channel toward a mobile system determined at least partly based on a vehicle-position-index-dependent and vehicle-heading-dependent suitability indicator of the channel. The implementation further includes a module that controls the device-readable medium. In addition to the foregoing, other network subsystem aspects are described in the claims, drawings, and text forming a part of the present disclosure.

Another embodiment is also a network subsystem. In one implementation, the subsystem includes a mobile system and means for transmitting data through the mobile system at least partly based on a heading-dependent suitability indicator of a channel that includes the mobile system. In addition to the foregoing, other network subsystem aspects are described in the claims, drawings, and text forming a part of the present disclosure.

In one or more various aspects, related systems include but are not limited to circuitry and/or programming for effecting the above-described method aspects; the circuitry and/or programming can be virtually any combination of hardware, software, and/or firmware configured to effect the above-described method aspects depending upon the design choices of the system designer.

In addition to the foregoing, various other embodiments are set forth and described in the text (e.g., claims and/or detailed description) and/or drawings of the present description.

The foregoing is a summary and thus contains, by necessity, simplifications, generalizations and omissions; consequently, those skilled in the art will appreciate that the summary is illustrative only and is NOT intended to be in any way limiting. Other aspects, features, and advantages of the devices and/or processes described herein, as defined by the claims, will become apparent in the detailed description set forth below.

BRIEF DESCRIPTION OF THE FIGURES

FIG. 8 illustrates further examples and alternative embodiments of the above-described operational flows.

FIG. 9 illustrates additional operational flows having operations that produce a desirable form of data transfer in a network like that of FIG. 2 or FIG. 7.

FIG. 22 shows a map showing a latitude and longitude of several nodes, some of which correspond to a row in the table of FIG. 21, some or all of which are suitable for relaying information.

The use of the same symbols in different drawings typically indicates similar or identical items.

DETAILED DESCRIPTION

Figure 2:
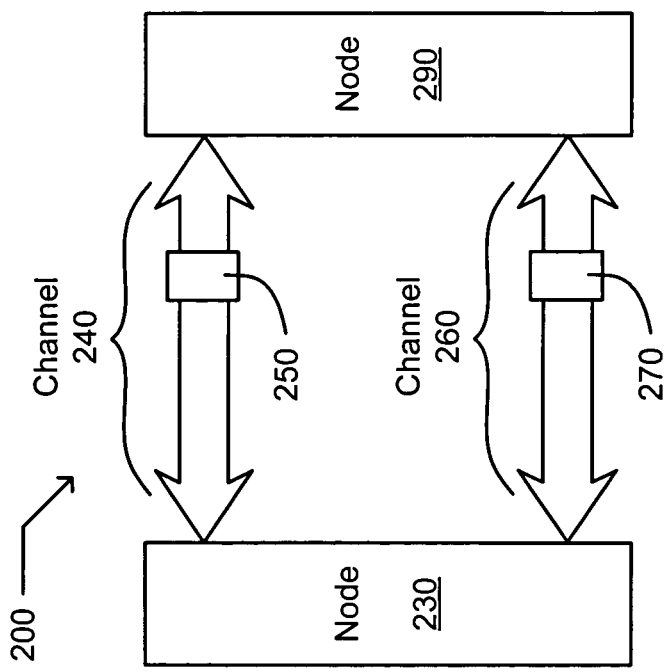
FIG. 2 illustrates a portion of a network that can perform either of the operational flows of FIG. 1.

Except as otherwise indicated, all ordinary words and terms used herein shall take their customary meaning. All technical terms shall take on their customary meaning as established by the appropriate technical discipline utilized by those of ordinary skill. For convenience, many of the terms are described next. For brevity, each example or enumeration or alternative thus presented is merely illustrative, not exhaustive.

As used herein, even words like "is" are often used to indicate "may include," although there are exceptions below in which context dictates otherwise. A "node" is not limited to an integrated module, for example, but may include any device or station that implements at least some part of one or more communication protocols. A "mobile node" is not limited to systems that are capable of positioning themselves, but alternatively includes any node that can normally function while in motion. A vehicle or other node is "determined" not only by deciding upon it but alternatively by accepting or indicating or causing such a decision. A node can be determined even by a system that cannot explicitly identify the node, such as by a system that broadcasts a message to all nodes within its range, for example.

A "heading" is not limited to a direction of a forward end of a ship relative to true north, but can alternatively refer to a direction of travel of any moving node, relative to any frame of reference of a moving or stationary object. Also a heading is not limited to a two- or three-dimensional direction, but can alternatively include a more general heading such as "westerly" or "away from" an object. A "passenger vehicle" is not limited to a vehicle with a passenger but refers to any artificial mode of transporting a person. This includes an airplane, a boat, a train, a truck, or a wheelchair, for example. A "motor-propelled vehicle" is not limited to a vehicle currently in transit, but also includes motorized vehicles that are stationary and/or powered off.

A "method" as used herein is a set of one or more operations, whether performed in a specifically prescribed order as shown or concurrently or in some other order. It will be apparent to those skilled in the art that almost all methods described below can be performed by overlapping the steps of the prescribed flow or by reversing some or all of them, relative to the flow presented. One of skill in the art will recognize that such variations to the flows presented below are frequently convenient and should be considered as a viable design choice for implementing the present invention.

A "wireless" network or link is not limited to one that is devoid of wires, but may include any network or link with at least one node adaptable to transmit to another node through a free space medium or water, for example.

"Routing information" is not limited to an explicit identification of nodes through which a message will travel but alternatively includes any indication of where or how a signal has traveled or should travel. "Obtaining" information is not limited to receiving the information but can alternatively include requesting, computing, adapting, copying, retrieving, and otherwise preparing to use, store or transmit the information.

A message that is "responsive to" routing information is not limited to one that travels immediately to the routing information's point of origin. Rather, the message can be constructed some time later based on the routing information. Alternatively or additionally, the message is then stored in place or sent out via another channel than that which carried the routing information. Alternatively or additionally, the message can be sent back along a route that carried the routing information. A system that is "operable to respond" to a suitability indicator is not limited to a system that is responsive to the indicator. For example, a system can be offline and yet "operable to respond," such as by powering on and receiving the indicator before responding.

A determination is "based on" an input not only when based solely on the input, but alternatively when other determinants also affect it. A value is "based on" a signal or other condition not only when the condition is understood but alternatively when a change in the value is the only indication of any shift in the condition. A determination can be based on a heading-dependent indicator, for example, even by a system that knows of no other heading-related factors.

Systems are "suitable" not only if they successfully serve their functions, but alternatively if indicators suggest high likelihoods of success in serving those functions. Such a function might be a specific data transfer request, for example, or data handling in general. A system is "more suitable" than another if its likelihood of success is higher than that of the other. A "suitability indicator of a channel" is any value that is relevant to any such likelihoods of the channel's success, such as a suitability indicator of a mobile node in the channel.

A system "relaying data" is not limited to one that outputs exactly the same data that it receives in exactly the same format. For example, a system that decrypts and demodulates received data can relay data that it receives so that the relayed portion of the data is in a different format from the received data. A device can "transmit" data even without generating any data or amplifying a signal. A basic wire transmits data passively, for example.

Figure 1:
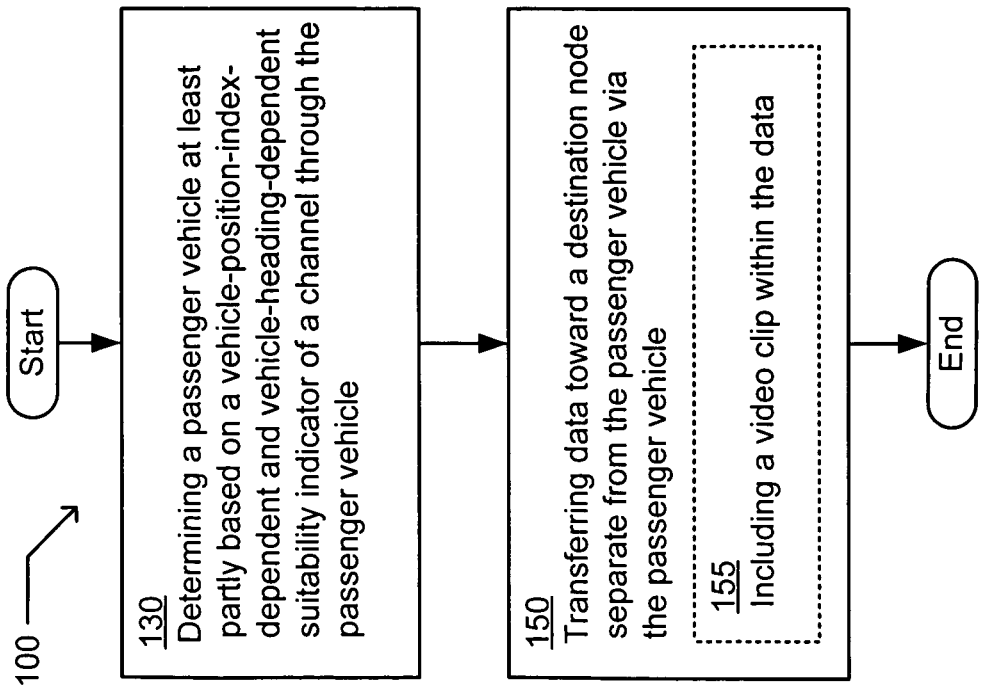
FIG. 1 illustrates operational flows having operations that produce a desirable form of data transfer.

Referring now to FIG. 1, there are shown operational flows having operations that produce a desirable form of data transfer. After a start operation, an operational flow 100 moves to a determining operation 130 where a passenger vehicle is determined at least partly based on a vehicle-position-index-dependent and vehicle-heading-dependent suitability indicator of a channel through the passenger vehicle. The suitability indicator may be obtained as a numerical evaluation, an instruction, or an action, for example. At a transferring operation 150, data is transferred toward a destination node separate from the passenger vehicle via the passenger vehicle. Transferring operation 150 can optionally be performed during and/or after determining operation 130. Optionally the transferring operation 150 comprises including a video clip within the data 155. This can be performed before, during, or after the determining operation 130. After the transferring operation 150, operational flow 100 moves to an end operation.

FIG. 2 illustrates a portion of a network 200 that can perform either of the operational flows of FIG. 1. Network 200 can be an ad hoc wireless network, for example. Node 230 is configurable to communicate with node 290 through at least one of a plurality of channels 240,260. Channel 240 includes at least one intermediate node 250. Intermediate node 270 similarly forms a part of channel 260, which is arranged in parallel with channel 240.

In accordance with an example embodiment in which intermediate node 250 is a vehicle (such as a passenger vehicle and/or a motor-propelled vehicle), node 230 performs operational flow 100. One or more suitability indicators of channel 240 are obtained using at least a heading and position index of the passenger vehicle. In a simple embodiment in which channel 240 is just a free space region containing node 250, for example, a suitability indicator for the vehicle can suffice as an overall indicator of the suitability of channel 240 to relay a signal. In another embodiment channel 240 contains several additional nodes. If all of the additional nodes are stationary or negligibly burdened, a suitability indicator pertaining to the vehicle (node 250) can likewise suffice as an overall suitability indicator of channel 240 to relay signals. Once node 230 determines one or more intermediate nodes to be used 130, node 230 transfers data toward destination node 290 through channel 240 (and via the passenger vehicle).

Figure 3:
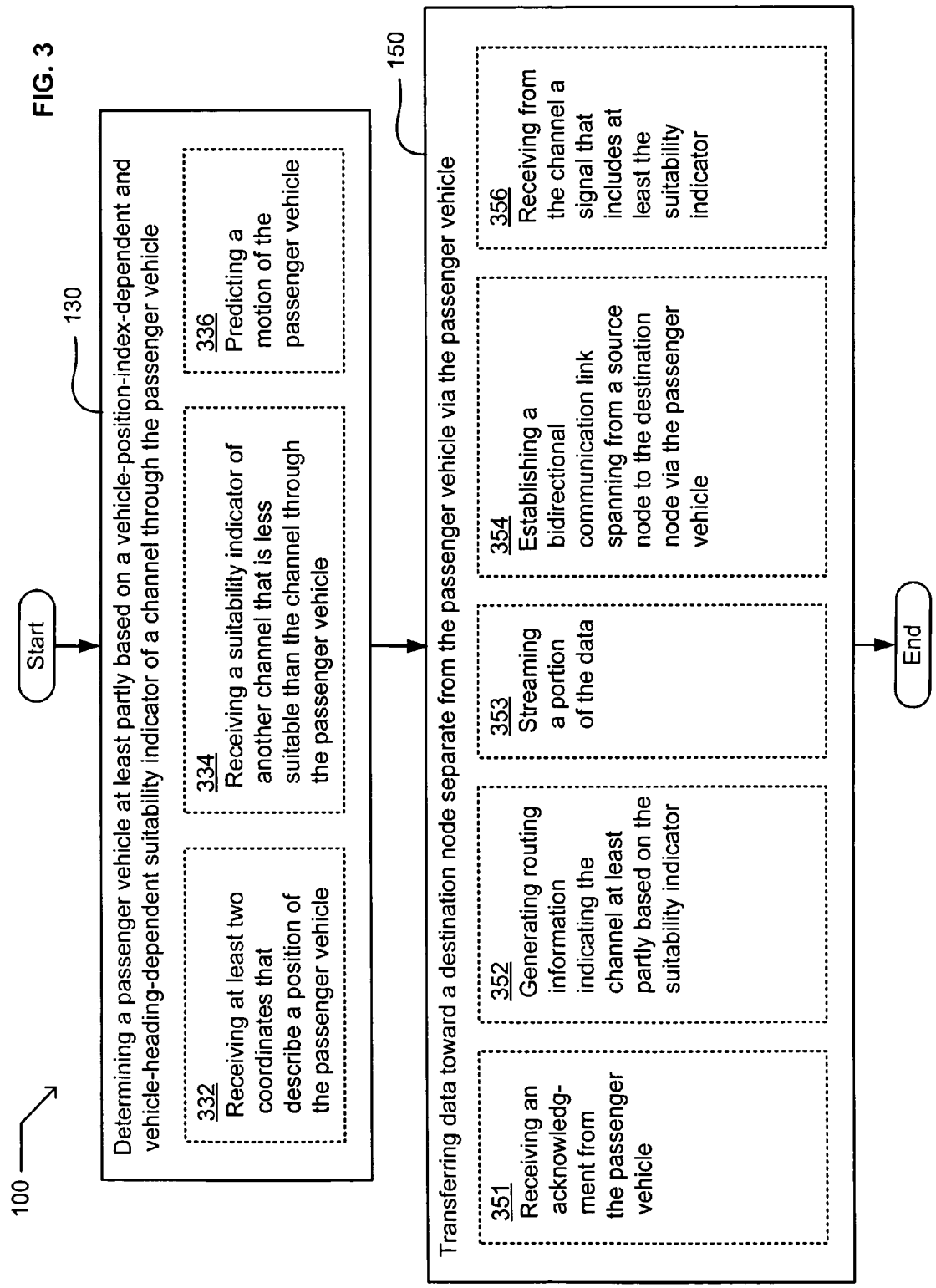
FIG. 3 illustrates various examples and alternative embodiments of the above-described operational flows.

Referring now to FIG. 3, there are shown various optional features of the above-described forms of operational flow 100 of FIG. 1. Any of these forms and features can be performed, for example, by node 230 of FIG. 2. As shown in FIG. 3, the determining operation 130 optionally includes one or more additional operations of operation 332, operation 334, or operation 336. Also the transferring operation 150 optionally includes one or more additional operations of operation 351, operation 352, operation 353, operation 354, or operation 356. Any of these additional operations, and many combinations of them, may provide unexpected enhancements in computational efficiency or system performance.

At the operation 332, at least two coordinates that describe a position of the passenger vehicle are received. For example, node 230 may receive a latitude and a longitude of one or more vehicles such as node 250. Also, or alternatively, node 230 may receive an altitude or an offset distance between the vehicle and another node (such as node 230, 270 or 290). The coordinates may be in angular or distance units, for example. The optional operation 332 of actually receiving coordinates may facilitate an accurate vehicle-position-index-dependent suitability indicator, for example, by tracking locations at which the suitability indicator does not accurately predict success so as to allow for refinements.

At the operation 334, a suitability indicator of one or more other channels is received. For example, node 230 may receive 0.6 as a suitability score of channel 260. This can then be compared to a 0.8 received as a suitability score of channel 240. In a "best channel selection" embodiment in which each channel provides a score that is directly related to its overall suitability, node 230 responds by choosing channel 240 for the transferring operation 150. Receiving a suitability indicator of one or more other channels can facilitate selecting a most suitable channel so as to reduce congestion, for example, or other node saturation or dropouts.

At the operation 336, a motion of the passenger vehicle is predicted. The motion may include at least one of a predicted position index, a predicted speed, or a predicted heading. For example, node 230 may contain a detailed model identifying a specific route to a specific destination including several portions each having a respective speed. Such a model can be provided by an on-board navigation system directing the driver to a known destination, for example. Alternatively node 230 may generate and express the motion simply as a time at which the passenger vehicle is predicted to reach a given landmark such as a service zone boundary. Optionally the predicted motion can be used to help maintain a connection between two nodes by initiating a re-routing operation before the old link becomes unstable. This is especially helpful near high gradients of wireless connectivity, such as may exist near large buildings or tunnels.

At the operation 351, an acknowledgment is received from the passenger vehicle. For example, node 230 may receive an acknowledgment from the passenger vehicle (node 250) determined by operation 130. In a case such as where heading or position index data is used more than a second after being measured, a risk exists that the passenger vehicle may have gone offline or otherwise become unsuitable. The acknowledgment received in operation 351 can verify that such conditions are not present. Also, the received acknowledgment may include another suitability indicator of the channel or data upon which node 230 can base another suitability indicator. The acknowledgment is optionally used as part of a handshake operation between node 230 and node 250 before node 230 sends a user data block via node 250.

At the operation 352, routing information is generated that indicates the channel at least partly based on the suitability indicator. The routing information can include at least one of a channel identifier, specific identifiers of one node or several nodes within the channel, one or more position indices, or heading information. Other examples are discussed in detail below, especially in reference to FIG. 11.

At the operation 353, a portion of the data is streamed. For example, node 230 can transfer a portion of the data comprising audio or video data toward the destination node via the passenger vehicle (node 250) by streaming. The streamed portion can include live broadcast data, security or health monitoring data, or other time-critical data such as experimental measurements. The non-streamed portion may include a digital header identifying such things as the destination node, advertising, or an authorization.

At the operation 354, a bidirectional communication link is established spanning from a source node to the destination node via the passenger vehicle. For example, node 230 or channel 240 can establish such a communication link through channel 240. Optionally such a link can be used for real time monitoring or interactions between users such as for meeting or game playing over a network. The data can include phonic or textual data, software objects, pictures, or any other kind of data that can benefit from real-time exchange at high or low volumes.

At the operation 356, a signal is received from the channel that includes at least the suitability indicator. For example, node 270 can receive such a signal. Optionally node 270 can then make a routing decision based on a comparison between the suitability indicator and that of one or more parallel channels such as channel 260.

Figure 4:
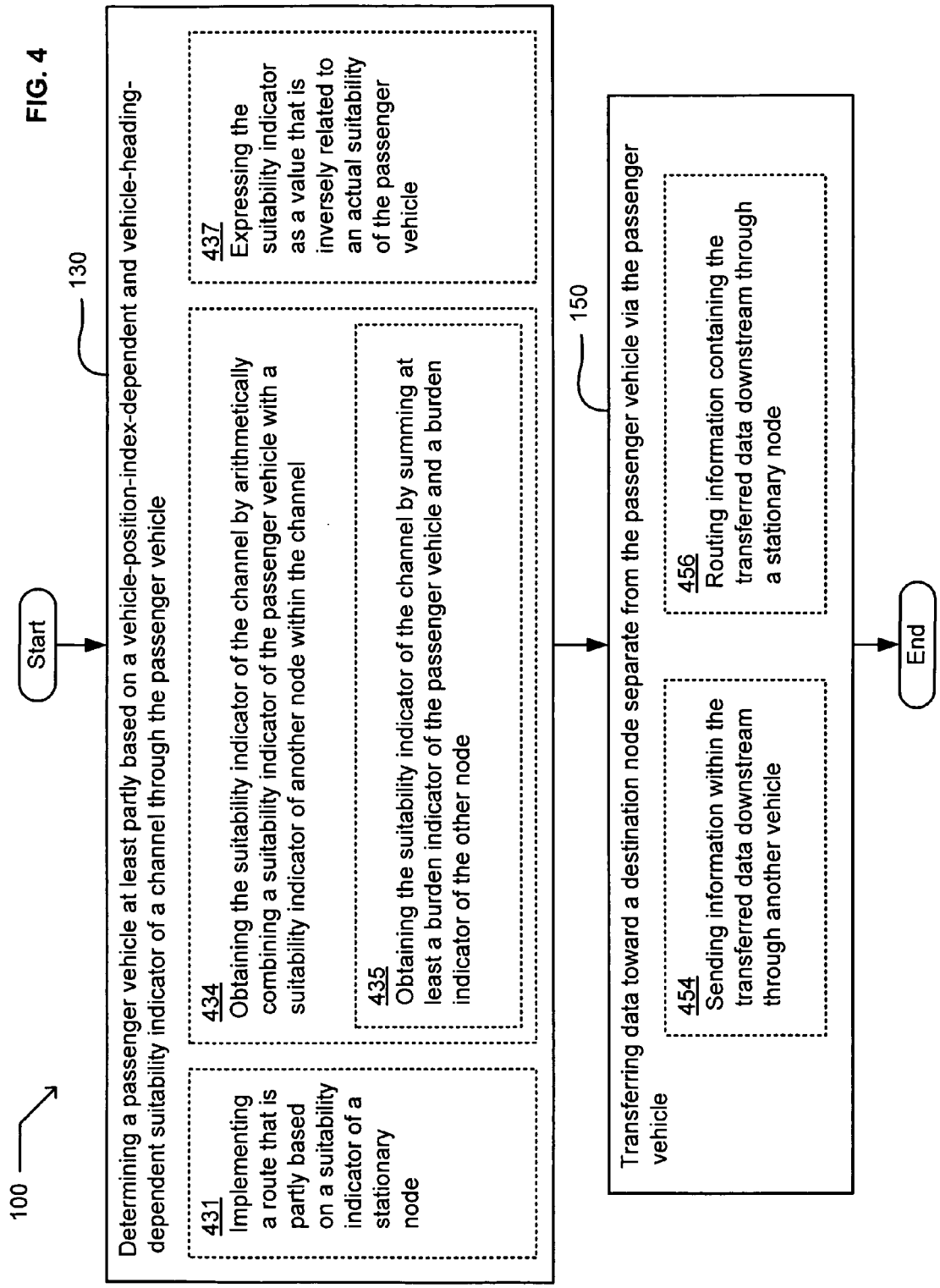
FIG. 4 illustrates further examples and alternative embodiments of the above-described operational flows.

Referring now to FIG. 4, there are shown various optional features of the above-described forms of operational flow 100, any of which can be performed by node 230 of FIG. 2. As shown in FIG. 4, for example, the determining operation 130 optionally includes one or more additional operations of operation 431, operation 434, operation 435 or operation 437. Also the transferring operation 150 optionally includes one or more additional operations of operation 454 or operation 456. Any of these additional operations may provide unexpected enhancements in computational efficiency or system performance.

At the operation 431, a route is implemented that is partly based on a suitability indicator of a stationary node. At the operation 434, alternatively or additionally, the suitability indicator of the channel is obtained by arithmetically combining a suitability indicator of the passenger vehicle with a suitability indicator of another node within the channel.

At the operation 437, the suitability indicator is expressed as a value that is inversely related to an actual suitability of the passenger vehicle. For example, if D is a variable such that $D=0.9$ for an unsuitable system, and $D=0.3$ for a moderately suitable system, and $D=0.1$ for a highly suitable system, then D can be a convenient burden indicator. Such values, generally ones that are inversely related to suitability, can be combined for evaluating a channel more exactly, in certain embodiments. At the operation 435, for example, the suitability indicator of the channel is obtained by summing at least a burden indicator of the passenger vehicle and a burden indicator of another node. An example is described below in reference to FIG. 11.

At the operation 454, information within the transferred data is sent downstream through another vehicle. At the operation 456, information containing the transferred data is routed downstream through a stationary node. These and other examples are shown in detail below, especially in reference to FIG. 11.

In accordance with another example embodiment in which intermediate node 250 is a passenger vehicle, channel 240 performs operational flow 100. One or more suitability indicators of channel 240 are obtained. Optionally each of the suitability indicators is dependent on attributes of a respective single node of channel 240. The suitability indicator that describes node 250, a passenger vehicle, depends on a heading and position index of node 250. Channel 240 uses the one or more suitability indicators to determine the one or more nodes of channel 240 as suitable or unsuitable to convey a given message.

In one operative example, channel 240 receives a request to send 2 gigabytes of video data within one minute. In response, channel 240 determines a node that constitutes a weakest or weaker link and whether that weak link is strong enough to meet the demand. If node 250 is a passenger vehicle predicted to go offline momentarily based on its heading and position, channel 240 does not commit to relaying the video data within the prescribed time limit. If node 250 is predicted to go online momentarily and remain available for high throughput service, however, channel 240 can determine node 250 as a weak link that is strong enough to begin the transmission.

Figure 5:
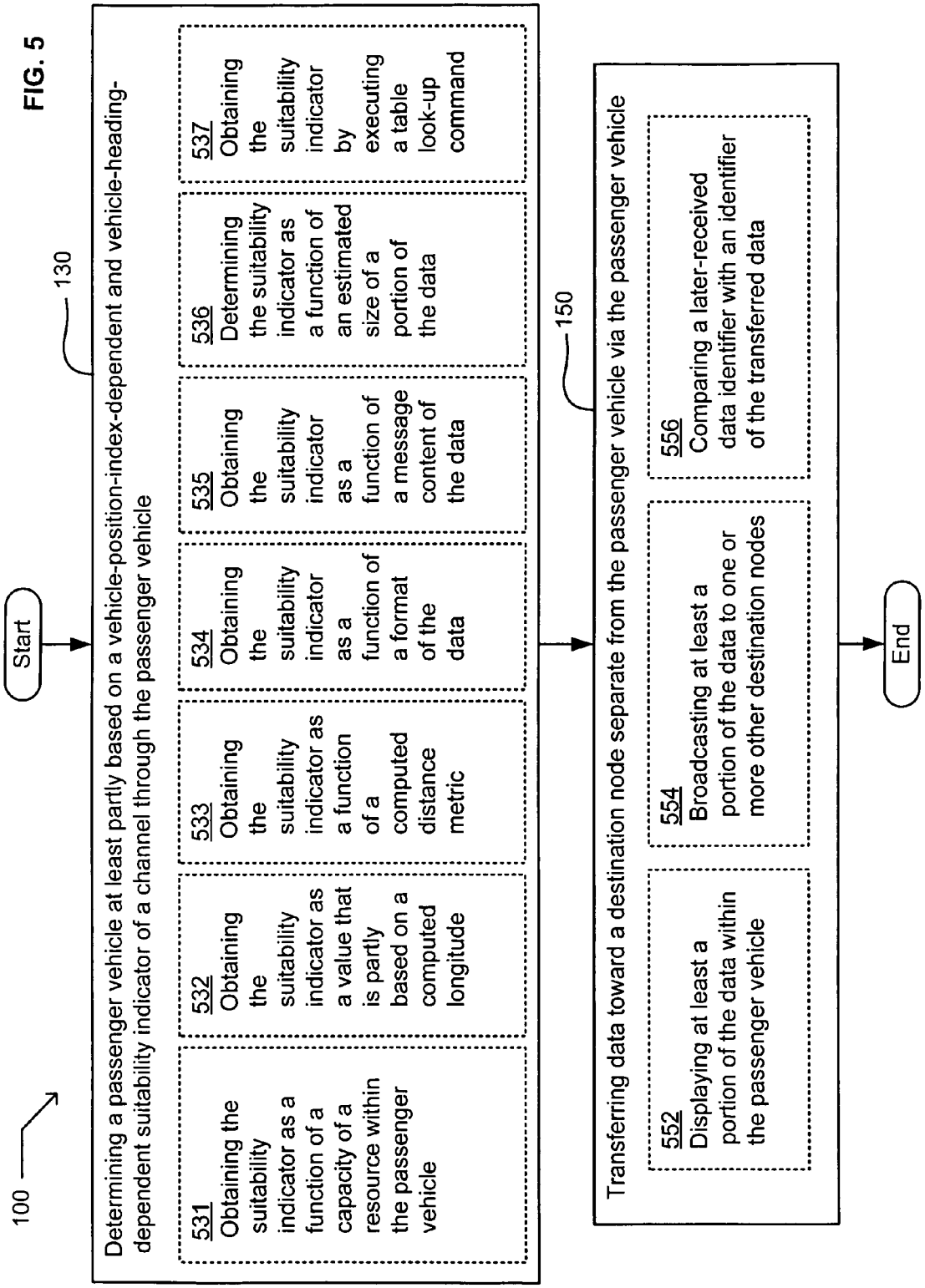
FIG. 5 illustrates further examples and alternative embodiments of the above-described operational flows.

Referring now to FIG. 5, there are shown various optional features of the above-described forms of operational flow 100. Any or all of these forms and features can be performed by node 230 or channel 240 of FIG. 2, for example. As shown in FIG. 5, the determining operation 130 optionally includes one or more additional operations of operation 531, operation 532, operation 533, operation 534, operation 535, operation 536, or operation 537. Also the transferring operation 150 optionally includes one or more additional operations of operation 552, operation 554 or operation 556. Any of these additional operations may provide unexpected enhancements in computational efficiency or system performance when performed by a system like node 230 and/or channel 240 of FIG. 2.

At the operation 531, the suitability indicator is obtained as a function of a capacity of a resource within the passenger vehicle. The resource may be a processor, a data bus, a user interface, an electrical supply or any other identifiable subsystem or component with a capacity that can change or may differ from node to node. At the operation 532, optionally concurrent with operation 531, the suitability indicator is obtained as a value that is partly based on a computed longitude. At the operation 533, the suitability indicator is obtained as a function of a computed distance metric. The distance metric may be expressed conventionally in meters or miles or other units, a distance index, or in some other coding scheme as a matter of efficiency and design choice. Specific examples are explained in detail below, especially in reference to FIGS. 13 & 21.

At the operation 534, the suitability indicator is obtained as a function of a format of the data. For example, a given node or channel having a bit-error rate (BER) higher than 1/107 can assign an indication of higher suitability for streaming data than for other video data. A greater suitability may similarly be assigned for data in a proprietary format, for packet data, for text data, for low resolution image data, for non-encoded data, for headerless data, for data having an identified owner, and/or for other identified indicators of format.

At the operation 535, the suitability indicator is obtained as a function of a message content of the data. A greater suitability may be assigned for an urgent message, for example, or for content such as weather that is in a content category that has been selected at a user interface within the vehicle, for private content, for "push" content such as advertising, for cost-free content, and/or for other identified indicators of content.

At the operation 536, the suitability indicator is determined as a function of an estimated size of a portion of the data. For example, the estimated size may be expressed in digital units such as bytes or blocks, in time units such as seconds, in coarse descriptive categories such as "huge," or in some other form of expression.

At the operation 537, the suitability indicator is obtained by executing a table look-up command. Optionally, a succession of table look-up commands can be used, or a table look-up operation implemented as a logic operation or another form of data or other signal processing. Examples are given below, especially in reference to FIGS. 15 & 21.

At the operation 552, at least a portion of the data is displayed within the passenger vehicle. The portion may be an indicator of a size, a content type, a format type, a link type, a source node identifier, an owner, a destination location, a service provider, or some other portion of the routing or message content.

At the operation 554, at least a portion of the data is broadcasted to one or more other destination nodes. An emergency broadcast may be transmitted to two or more nodes simultaneously, for example, or to all nodes of a defined class within a defined geographical area. The class can be defined as a set of subscribers, a set of nodes having an on-board or other local global positioning system (GPS), nodes having an active user interface, nodes that are moving toward a danger zone, or using some other class definition.

At the operation 556, a later-received data identifier is compared with an identifier of the transferred data. Where no match is found between the later-received data identifier and any prior data identifier, the data is optionally broadcast to all available nodes in the network. Although this approach expends significant network bandwidth, it can be optimal in a wireless network in which the location of the destination node is unknown. Optionally this approach can be used to determine coordinates of the destination node.

In another example operational flow 100 relating to FIG. 2, in which intermediate node 250 is a passenger vehicle, a destination node 290 receives several signals. These include (a) a signal that channel 240 is available, (b) a signal that channel 260 is available, and (c) a signal that node 230 has critical information to transmit. Node 290 instructs node 230 to transmit the critical information in portions of data flowing in parallel among the available channels 240,260. Node 230 actually performs operational flow 100 in response to the instruction, in this embodiment, determining the one or more nodes 250 that will receive a portion of the data by transferring the portion through channel 240. Alternatively, for redundancy, node 230 can send all of the data in parallel across the two or more available channels 240,260.

Figure 6:
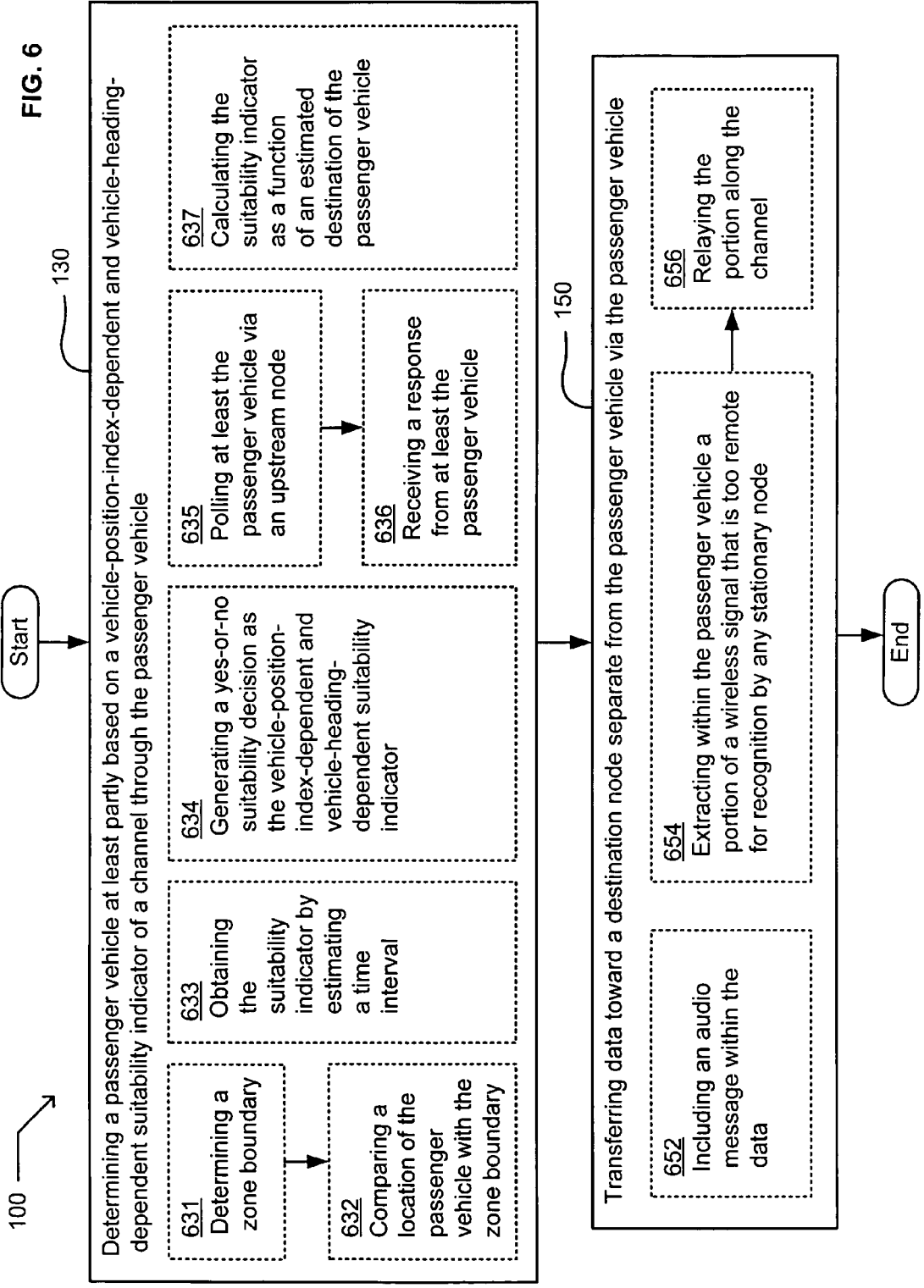
FIG. 6 illustrates further examples and alternative embodiments of the above-described operational flows.

Referring now to FIG. 6, there are shown various optional features of the above-described forms of operational flow 100 of FIGS. 1, 3, 4, & 5. All of these forms and features can be performed by channel 240 and/or node 230 of FIG. 2, for example, as exemplified below. As shown in FIG. 6, the determining operation 130 optionally includes one or more additional operations of operation 631, operation 632, operation 633, operation 634, operation 635, operation 636, or operation 637. Also the transferring operation 150 optionally includes one or more additional operations of operation 652, operation 654 or operation 656. Any of these additional operations may provide unexpected enhancements in computational efficiency or system performance when performed in an environment like that of FIG. 2.

At the operation 631, a zone boundary is determined. The boundary may be a contour that divides two areal zones on a two-dimensional map, as exemplified in FIG. 19 or FIG. 21. The boundary may also be a point that divides two segmented zones in a one-dimensional model, as exemplified in FIG. 14. Boundaries are a convenient way to express a spatial model such as a service zone. The zone boundaries are optionally determined that describe a service zone slightly within the area actually serviced, for example, to provide a buffer. After completing the operation 631, node 250 of channel 240 can perform the operation 632 of comparing a location of the passenger vehicle with the zone boundary. Alternatively, node 250 can provide coordinates of its location to node 230 which can then complete the comparing operation 632.

At the operation 633, the suitability indicator is obtained by estimating a time interval. The time interval can describe part or all of the data to be transferred, an amount of time until a service will be available, or an amount of time that a service will remain available, for example. Optionally, the suitability indicator may itself be an estimate of time. For example a node that is expected to remain available for 3 minutes can be described as having a 3-minute suitability. Such a suitability is adequate for a 10-second message but not for a 30-minute download.

At the operation 634, a yes-or-no suitability decision is generated as the vehicle-position-index-dependent and vehicle-heading-dependent suitability indicator. Such a decision may be performed by node 230 before performing the transferring operation 150, for example, either as a function of received data or as a response to an instruction. In an embodiment in which channel 260 only contains stationary nodes and in which channel 240 has not yet performed determining operation 130, for example, node 230 can decide to use channel 260 instead for a given transmission. At the operation 637, the suitability indicator is calculated as a function of an estimated destination of the passenger vehicle.

At the operation 635, at least the passenger vehicle is polled via an upstream node. At the operation 636, alternatively or subsequently, a response is received from at least the passenger vehicle. Examples are discussed below in reference to FIGS. 11 & 22.

At the operation 652, an audio message is included within the data to be transferred toward a destination node. The audio message may optionally be generated by a user and received through a user interface of the source node 230, for example.

Additional operation 654 includes extracting within the passenger vehicle a portion of a wireless signal that is remote from substantially any available stationary node. This embodiment can be advantageous for providing a communication service via one or more passenger vehicles to locations that are remote from stationary nodes. At the operation 656, simultaneously or subsequently, the portion is relayed along the channel.

Figure 7:
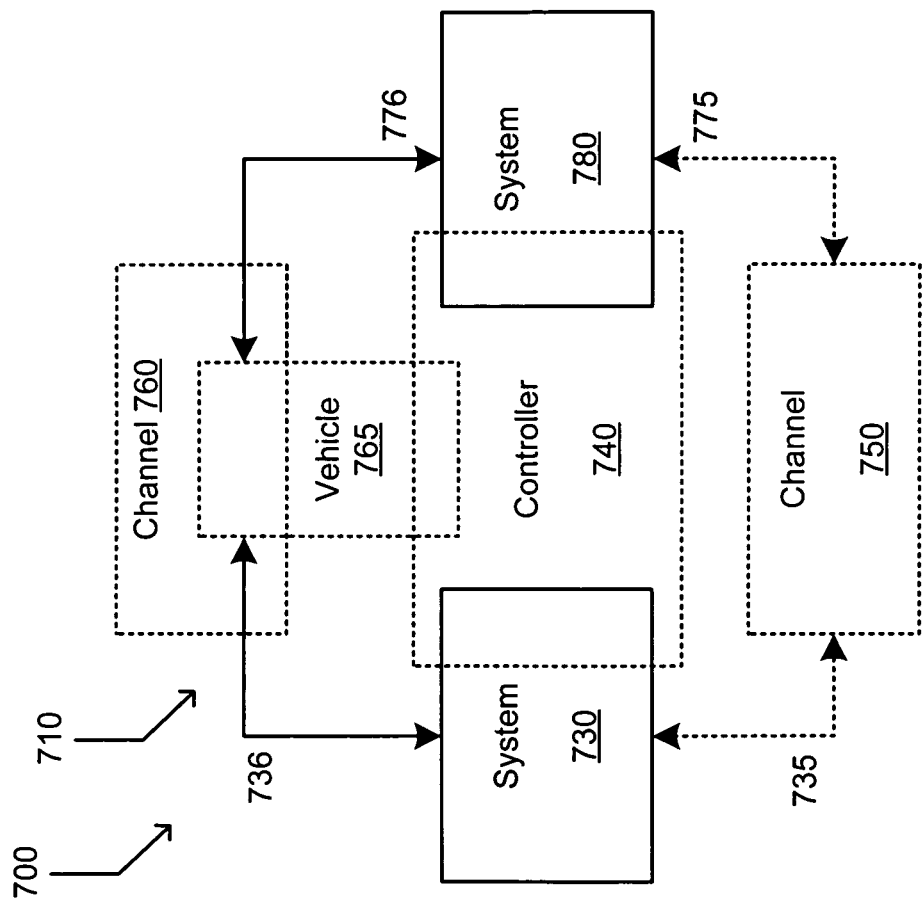
FIG. 7 illustrates a portion of a network that can be configured to perform any of the above-described operational flows.

Referring now to FIG. 7, there is shown a portion of a network 700 in which operational flow 100 in any of its above-described forms can be performed. Network 700 can be a wireless network, for example. System 730 is configurable to communicate with node 780 through one or more of a plurality of channels 760. Channel 760 traverses one or more intermediate nodes (vehicle 765, e.g.), connecting system 730 to system 780 through wireless links 736,776 as shown. Optionally, channel 750 can be arranged in parallel with channel 760, similarly connecting system 730 to system 780 through passive wireless links 735,775 as shown.

Controller 740 comprises circuitry, firmware or software that can be implemented in system 730, in vehicle 765, in system 780, or distributed so that components of controller 740 reside in more than one of these sites. Also some or all components of controller 740 can constitute a separate module.

In accordance with an example embodiment, controller 740 performs operational flow 100. One or more suitability indicators of channel 760 are obtained using at least a heading and position index of the passenger vehicle 765. In a simple embodiment where channel 760 is just air but for vehicle 765, for example, a suitability indicator for the vehicle 765 can suffice as an overall indicator of the suitability of channel 760 to relay data. In another embodiment channel 760 contains a sequence of several additional nodes. If all of the additional nodes are stationary or not significantly burdened, a suitability of vehicle 765 can likewise suffice as an overall suitability indicator of channel 760. Controller 740 determines one or more intermediate nodes to be used 130 and transfers data toward destination node 290 by issuing an instruction to node 730 to send the data through wireless link 736.

In accordance with another example embodiment, controller 740 does not perform operation 130 but merely relays a predicted motion of vehicle 765 that is received from vehicle 765. In this case, system 730 need not receive a vehicle heading that vehicle 765 used to predict the motion. System 730 instead just generates a suitability indicator of channel 760 from the predicted motion and uses channel 760 for transmitting the data, thereby performing the determining operation 130 and the transferring operation 150.

In accordance with another example embodiment, controller 740 of FIG. 7 performs operation 130 by performing at least one of operation 332 or operation 336 of FIG. 3. To perform operation 332, for example, controller 740 receives from vehicle 765 at least two coordinates that describe a position of vehicle 765. Controller 740 can provide a result of the determining operation 130 to system 730, for example, or perform operation 150 as described in the previous paragraph. In either case, system 730 responds by initiating a transfer of the data toward system 780.

Alternatively or additionally, controller 740 of FIG. 7 can perform at least one of operation 351, operation 352, or operation 354 of FIG. 3. At the operation 351, controller 740 can receive an acknowledgment from vehicle 765 in response to vehicle 765 receiving a signal from system 730. At the operation 352, controller 740 generates routing information, optionally indicating each node of channel 760. System 730 can receive the routing information and forward it through the channel 760 with the transferred data. At the operation 354, controller 740 can establish a communication link spanning from system 730 to system 780.

According to an alternative embodiment, controller 740 of FIG. 7 performs operation 130 by performing at least one of operation 431, operation 434, or operation 437 of FIG. 4. Controller 740 can further perform operation 150 by performing operation 454 or operation 456 of FIG. 4.

According to another alternative embodiment, controller 740 of FIG. 7 performs operation 130 by performing at least one of operation 531, operation 532, operation 533, operation 534, operation 535, operation 536, or operation 537 of FIG. 5. In performing operation 130, for example, controller 740 can execute a look-up instruction that simultaneously performs operations 532 and 534 by obtaining the suitability indicator as a function of the format of the data that provides a value that is partly based on a computed longitude. A table for such a look-up instruction is provided in relevant part, for example, in FIG. 21.

According to an alternative embodiment, controller 740 of FIG. 7 performs operation 130 by performing at least one of operation 631, operation 633, or operation 634 of FIG. 6. Alternatively or additionally, controller 740 can perform operation 150 by performing operation 652 or operation 654 of FIG. 6. Further examples are explained below, especially in reference to FIG. 11.

Any of the foregoing combinations described with reference to FIG. 7 may provide unexpected enhancements in computational efficiency or system performance when used to perform operational flow 100 as described and depicted in FIG. 1, 3, 4, 5 or 6.

Referring now to FIG. 8, there are shown various optional features of the above-described forms of operational flow 100 of FIG. 1. These forms and features can be performed by node 230 of FIG. 2 or by controller 740 of FIG. 7, for example. As shown in FIG. 8, the determining operation 130 optionally includes one or more additional operations of operation 831, operation 832, operation 833, operation 834, operation 835, or operation 836. Also the transferring operation 150 optionally includes one or more additional operations of operation 852 or operation 856. Any of these additional operations may provide unexpected enhancements in computational efficiency or system performance when performed in contexts like those of FIGS. 2 & 7.

At the operation 831, the suitability indicator is calculated as a function of the velocity of the vehicle also. At the operation 832, the suitability indicator is computed partly based on a heading of the passenger vehicle relative to an upstream node. In light of teachings herein, one of ordinary skill can select and readily obtain an effective suitability indicator as a function of a predicted vehicle destination and/or of any selection of additional variables described herein. An example is explained below, especially in reference to FIG. 14, which optionally includes a stationary node upstream from a relay node. A more detailed example is presented below in reference to FIG. 21.

At the operation 833, operation 130 indicates to the passenger vehicle that the channel is suitable only by initiating a transmission of the data. For example, system 730 of FIG. 7 completes operation 130 without the passenger vehicle receiving an indication that channel 760 is suitable for transmitting data. Vehicle 765 nevertheless receives an indication that channel 760 is suitable from system 730, the indication taking a form of a portion of the data arriving at vehicle 765.

At the operation 834, an indication is obtained of a location of a portable device that is outside the passenger vehicle. System 780 can be a portable device, for example, configured to send its GPS coordinates to controller 740. After performing operation 834, for example, controller 740 can optionally use this information for routing the data from system 730 through a suitable channel selected by any of several operational combinations taught herein.

At the operation 835, operation 130 identifies a boundary of a zone within which the suitability indicator is speed-independent. At the operation 836, an estimated offset distance is indicated between the passenger vehicle and a device that is outside the passenger vehicle. An example combining operation 835 and operation 836 is explained below in reference to FIGS. 14 & 15.

At the operation 852, the data is transferred from a next-node-upstream to the passenger vehicle using a signal power level that depends upon an estimated offset between the next-node-upstream and the passenger vehicle. The next node upstream can be a node that transmits data along a channel to the passenger vehicle through a passive medium such as air or wire. For bidirectional communications each intermediate node will have a next node upstream for each direction. An example is explained below in reference to FIG. 11.

At the operation 856, the data is transferred from the passenger vehicle to a node by a protocol that depends upon a value representative of a heading of the passenger vehicle relative to the node. For example, controller 740 can perform this operation as described below with reference to FIGS. 14 & 15.

Referring now to FIG. 9, there are shown alternative embodiments of an operational flow 900 that includes an obtaining operation 930 and a transmitting operation 950. In the obtaining operation 930, routing information is obtained that includes at least a vehicle-position-index-dependent and vehicle-heading-dependent data-handling-suitability indicator of a channel through a motor-propelled vehicle. Either embodiment of operational flow 900 can be performed by system 730, by controller 740, by channel 760, or by vehicle 765 of FIG. 7, for example, depending on implementation. Optionally, operation 930 includes operation 935 in which at least two coordinates are received that describe a location of the motor-propelled vehicle.

In a first implementation, vehicle 765 performs flow 900 without needing to perform the receiving operation 935. Vehicle 765 uses its position index (or positional coordinates) to determine the indicator to include in the routing information, which vehicle 765 then provides to system 730 or to whichever module(s) will perform the transmitting operation 950.

In a second implementation, vehicle 765 generates the indicator as described above and provides it to controller 740, which includes the indicator with other routing information (such as an identifier of each node in channel 760). Controller 740 then relays the routing information to system 730. System 730 performs the transmitting operation 950, optionally as a response to a transmit instruction from controller 740.

In a third implementation, vehicle 765 does not generate the indicator. Rather, vehicle 765 merely provides a self-descriptive position index and heading to channel 760, which generates the indicator. Channel 760 then either generates the routing information obtained by system 730 or provides the indicator to system 730 which uses the indicator to generate the routing information. (In this implementation system 730 performs operation 930 and controller 740 is not used.)

In a fourth implementation, vehicle 765 merely provides a self-descriptive position index and heading to controller 740, which generates the indicator. Channel 740 then either generates the routing information obtained by system 730 or provides the indicator to system 730 which uses the indicator to generate the routing information.

In a fifth implementation, vehicle 765 provides a self-descriptive position index and heading to controller 740 via wireless link 736 or controller 740. System 730 uses these as operands to generate routing information that includes at least a vehicle-position-index-dependent and vehicle-heading-dependent data-handling-suitability indicator. In this implementation system 730 optionally performs operation 935.

In the operation 950 of FIG. 9, a message is transmitted that is responsive to the routing information toward a destination node via the channel. This can be performed by system 730, by controller 740 (by transmitting an instruction, e.g.), by channel 760, or by system 780 of FIG. 7, for example.

Figure 10:
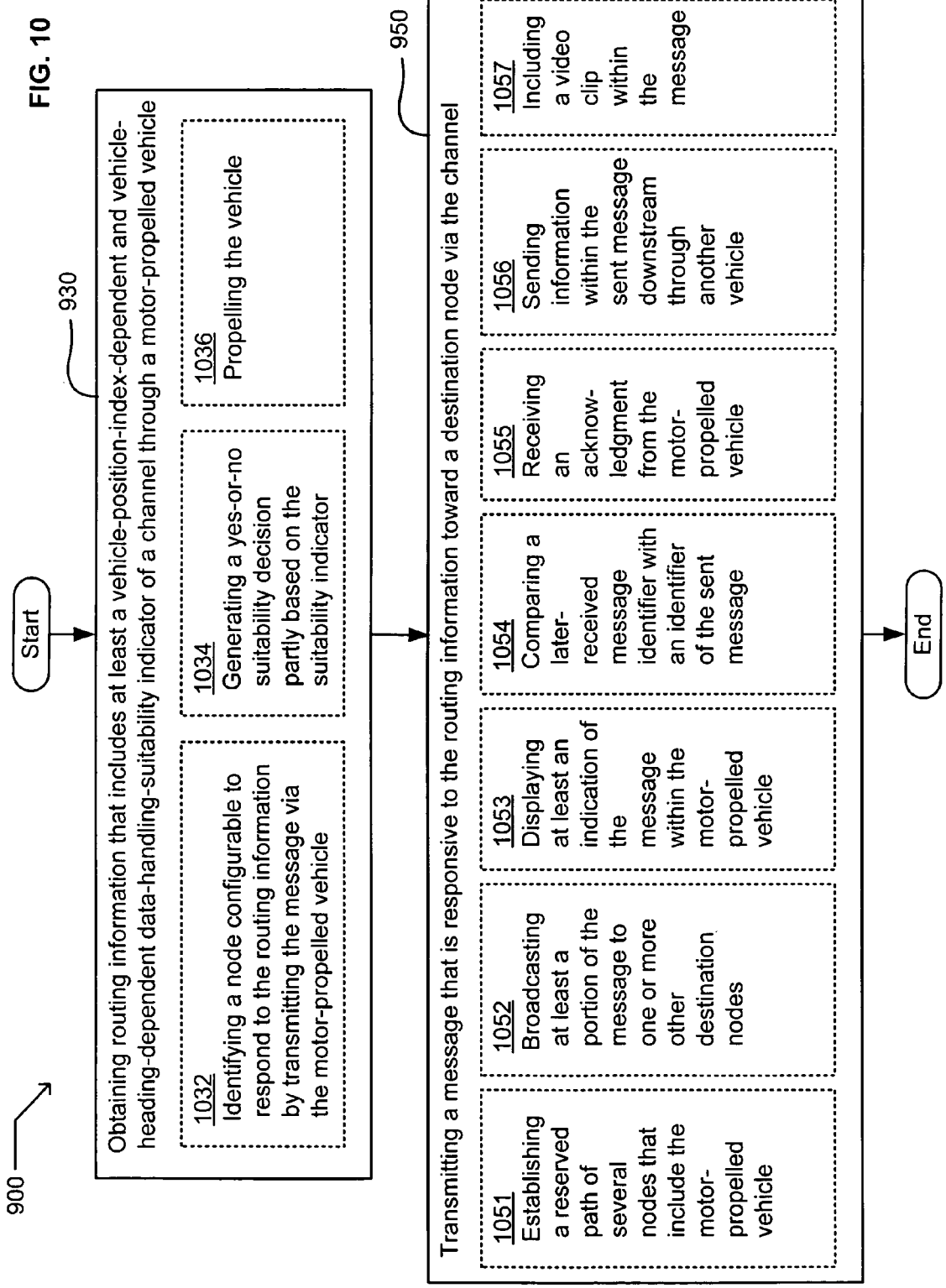
FIG. 10 illustrates various examples and alternative embodiments of either of the operational flows of FIG. 9.

Referring now to FIG. 10, there are shown various optional features of the above-described forms of operational flow 900 of FIG. 9. As shown in FIG. 10, the obtaining operation 930 optionally includes at least one of operation 1032 or operation 1034. In the obtaining operation 930, routing information is obtained that includes at least a suitability indicator of a channel through a motor-propelled vehicle. In the operation 1032, a node is identified that is configurable to respond to the routing information by transmitting a message via the motor-propelled vehicle. In the operation 1036, the vehicle is propelled. Operation 1036 is optionally performed responsive to a pilot, driver, operator, user or other person aboard the vehicle. Controller 740 of FIG. 7 can perform operation 1032, for example, by identifying system 730 as configurable to respond, such as by accepting an indication that system 730 has a message to be sent to a destination node and applying previously received connection layout information. System 730 can perform operation 1032 by identifying itself, alternatively or additionally, as a node capable of transmission. Optionally the system that performs operation 1032 has routing information identifying the motor-propelled vehicle or a suitability indicator of the channel through the vehicle.

In the operation 1034, a yes-or-no suitability indicator (a decision, e.g.) is generated that is partly based on the suitability indicator. For example, controller 740 can generate such a decision as a result of a comparison between a suitability indicator describing channel 760 and a suitability threshold. By applying one or more logical criteria such as this to a routing decision, controller 740 can implement intelligent routing. Alternatively or additionally, such a decision can likewise be generated by system 730, channel 760, or system 780.

Referring again to FIG. 10, in the transmitting operation 950, a message is transmitted that is responsive to the routing information toward a destination node via the channel. The transmitting operation 950 optionally includes at least one of operation 1051, operation 1052, operation 1053, operation 1054, operation 1055, operation 1056, or operation 1057. Any of these optional operations can be performed by system 730 or by controller 740, for example.

In the operation 1051, a system such as controller 730 of FIG. 7 establishes a reserved path of several nodes. For example, controller 730 can access attributes of the nodes such as an identifier of each or whether each node is stationary or mobile.

In the operation 1052, at least a portion of the message is broadcasted to one or more other destination nodes. For example, controller 740 may perform such a broadcast to other destination nodes of a given class that are found. For example, any receiving node in or approaching a tornado warning zone can be a suitable destination to which a warning message is broadcast.

In the operation 1053, at least an indication of the message is displayed within the motor-propelled vehicle. Such an indication may be used to alert a driver or other passenger of the vehicle so as to explain a reduction of available bandwidth, for example. Alternatively the message itself may be displayed within the motor-propelled vehicle, for example, if the message includes advertising or is otherwise a public message.

In the operation 1054, a later-received message identifier is compared with an identifier of the sent message. This can be used to limit the propagation of redundant copies of the sent message, for example.

In the operation 1055, an acknowledgment is received from the motor-propelled vehicle. System 730 can perform the receiving operation 1055, for example, in response to which system 730 can transmit another message. Each of these messages can be a packet of a larger body of data, for example.

In the operation 1056, information within the sent message is sent downstream through another vehicle. On an isolated stretch of roadway, for example, a communication channel may be constructed of two or more successive nodes that are each a motor-propelled vehicle or other mobile node. The sending operation 1056 may be performed by controller 740, by channel 760, or by vehicle 765, for example.

In the operation 1057, a video clip is included within the message. System 730 may perform this operation before performing one of the other optional operations of the transmitting operation 950, for example. The including operation 950 may even be completed before beginning the obtaining operation 930.

Any of the foregoing implementations and variations described with reference to FIGS. 9 & 10 may provide unexpected enhancements in computational efficiency or system performance when performed in environments like that of FIG. 7.

Figure 11:
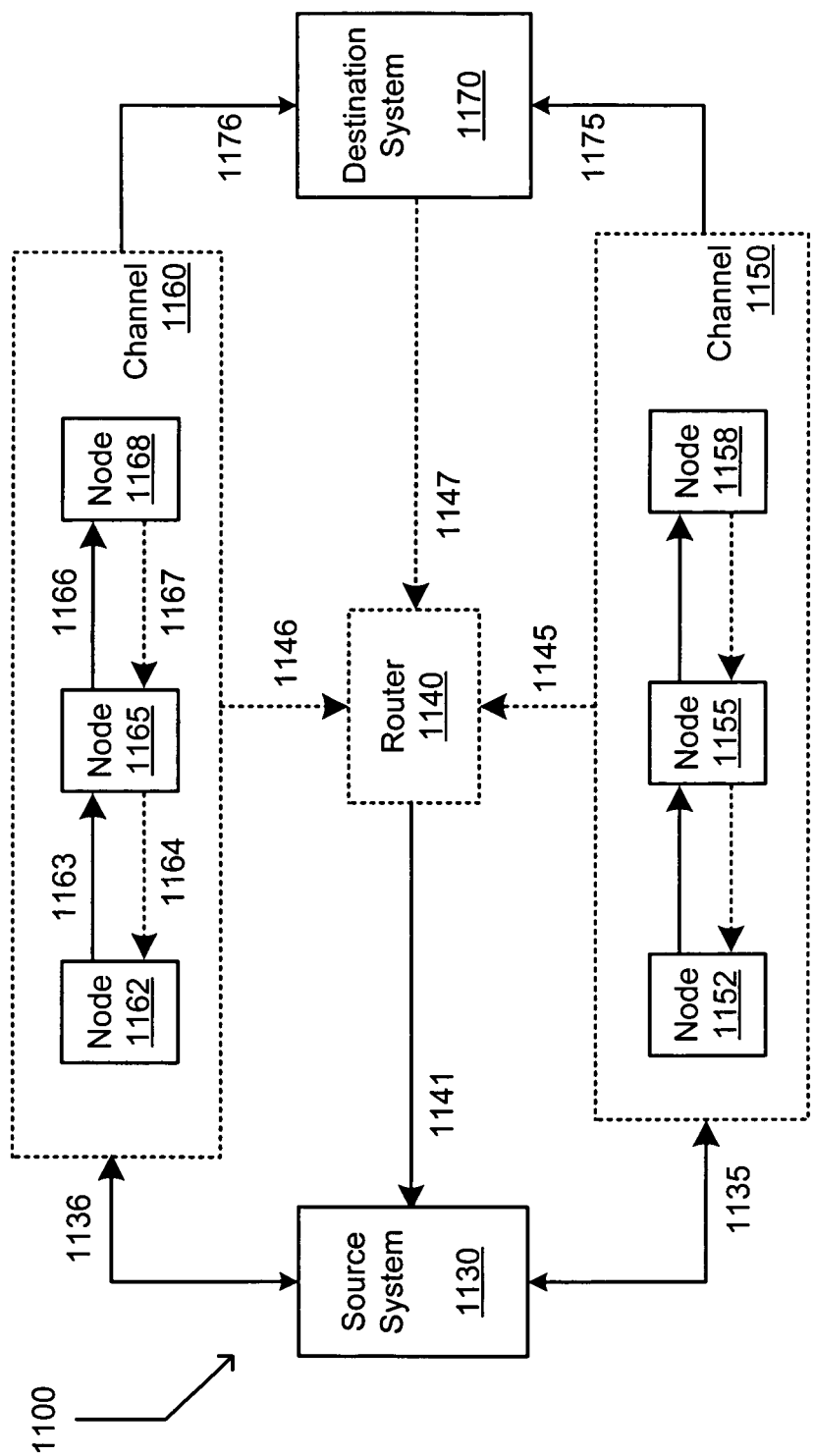
FIG. 11 illustrates a portion of a network in which many of the above-described operational flows can be performed.

Referring now to FIG. 11, there is shown a portion of a specifically configured network 1100 in which any of the above-described operational flows can be performed except as noted below. Source system 1130 is configurable to communicate with destination node 1170 through one or more of a plurality of channels 1150, 1160. Channel 1160 traverses one or more intermediate nodes connecting system 1130 to system 1170 through wireless links 1136, 1176 as shown. Channel 1150 is arranged in parallel with channel 1160, similarly connecting system 1130 to system 1170 through passive wireless links 1135, 1175 as shown.

Router 1140 is a stationary module comprising circuitry, firmware or software having information that is descriptive of one or more channels 1150, 1160 through which router 1140 can send messages or other data. Channel 1160 has a sequence of several nodes in which node 1162 is a next-node-upstream to node 1165, a passenger vehicle. Node 1168 is a next-node-downstream to the passenger vehicle in relation to data that travels downstream through link 1163 and link 1166 as shown. Feedback link 1164 and link 1167 optionally provides feedback data upstream. Feedback data optionally includes an acknowledgment signal or other information to be included in or otherwise used for generating routing information as described herein.

Router 1140 sends routing information 1141 at least partly based on channel output 1146 and optionally on feedback 1147 from destination system 1170. At times, other groupings of nodes 1152, 1155, 1158 will be positioned and available to provide one or more additional channels 1150, providing channel output 1145 to router 1140.

In an embodiment where node 1165 is a passenger vehicle, router 1140 can perform any of the various operational flows described above except those that include operation 354 of FIG. 3. (Link 1176 is unidirectional.)

In accordance with an example embodiment, router 1140 performs operational flow 100 including at least the generating operation 352 of FIG. 3. Router 1140 generates routing information indicating channel 1160 at least partly based on a position-index-dependent and heading-dependent suitability indicator of node 1165, a passenger vehicle. Router 1140 receives channel output 1146 that includes the indicator or operands from which the indicator can be generated. Router 1140 then completes the transferring operation 150 by providing routing information 1141 causing source system to send the data along channel 1160 toward destination node 1170.

In accordance with another example embodiment, intermediate node 1162 performs operational flow 100. In operation 130, node 1162 determines node 1165 at least partly based on a suitability indicator that depends on a position index and a heading of node 1165, the vehicle recited in operation 130. The suitability indicator can be a prescribed route that includes a link 1163 from node 1162 to node 1165, for example.

In accordance with another example embodiment, destination system 1170 performs operational flow 100 including at least obtaining operation 435 of FIG. 4. Destination system 1170 sums at least a burden indicator of node 1165 (a passenger vehicle) and a burden indicator of at least one other node (such as next-node-upstream 1162 and/or next-node-downstream 1168), for example. Destination system 1170 can determine the nodes within channel 1160 by selecting channel 1160, for example, responsive to one or more criteria that include determining that the sum of the burden indicators is below a prescribed limit. Destination system 1170 can then download the data by relaying the channel selection (as feedback 1147) to router 1140.

In accordance with another example embodiment, channel 1160 performs the determining operation 130 by performing at least the polling operation 635. Node 1162 of channel 1160 polls all available communication devices directly accessible through a respective wireless link through air, for example, one of which devices is node 1165.

In accordance with another example embodiment, node 1165 performs the transferring operation 150 by performing at least the routing operation 456, as shown in FIG. 4. Node 1165 routes the transferred data downstream through a stationary node. Optionally, the stationary node is a next-node-downstream 1168, the node just after 1165 in the forward data flow direction.

In accordance with another example embodiment, node 1162 performs operation 852 of FIG. 8. The data is transferred from a next-node-upstream 1162 to the passenger vehicle (node 1165) using a signal power level that depends upon an estimated offset between the next-node-upstream and the passenger vehicle.

Figure 12:
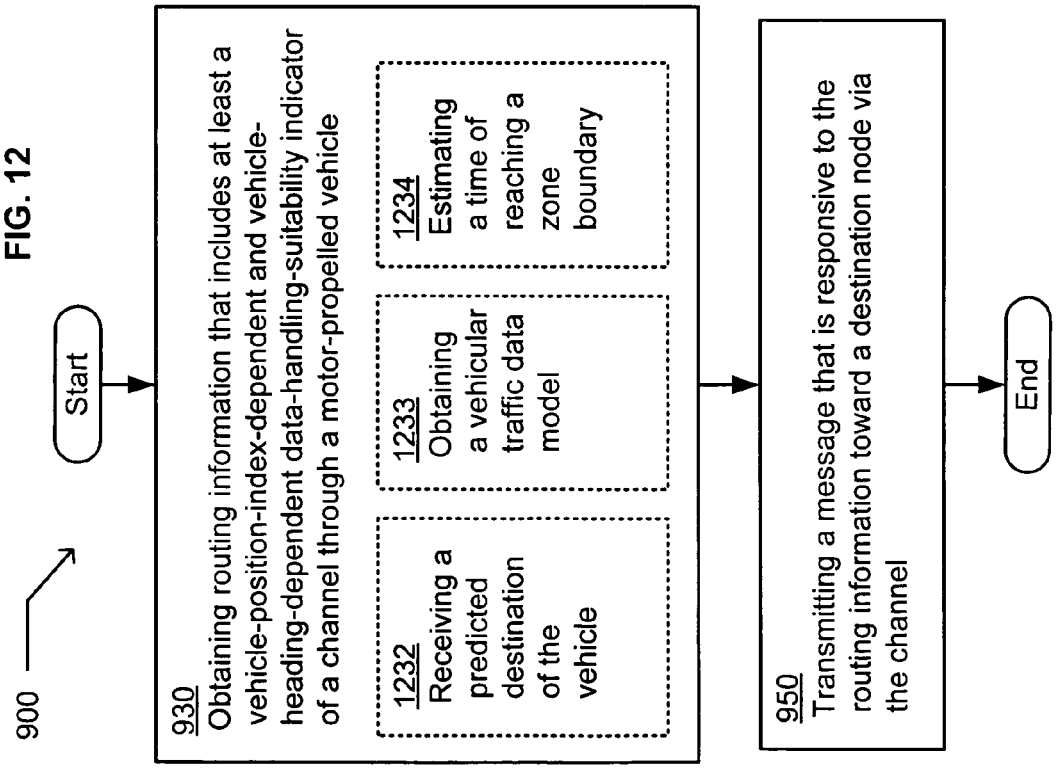
FIG. 12 illustrates various examples and alternative embodiments of either of the operational flows of FIG. 9.

Referring now to FIG. 12, there are shown various optional features of the above-described forms of operational flow 900 of FIG. 9, such as can be performed by any of the above-described nodes that can perform operation 930 and/or operation 950. As shown in FIG. 12, the obtaining operation 930 optionally includes at least one of operation 1232, operation 1233, or operation 1234. In the receiving operation 1232, a predicted destination of the motor-propelled vehicle is received. Optionally the predicted destination is used to generate a predicted path that is at least partly based on a traffic monitoring input from a sensor such as a camera.

In the obtaining operation 1233, a vehicular traffic model is obtained. For example, the model can be based on measured traffic levels or speeds and/or on a time of day or on a day of the week. Optionally the traffic model is from a traffic prediction service. The model may be static or it may be updated with one or more sensor signals in real time.

In the estimating operation 1234, a time of reaching a zone boundary is estimated. For example, the time may describe when the vehicle is predicted to enter and/or depart a given service zone. Preferably, one or more of the above operations is performed by a portion of network 1100 as described above, optionally in relation to a motorized vehicle as described below with reference to FIG. 17.

Figure 13:
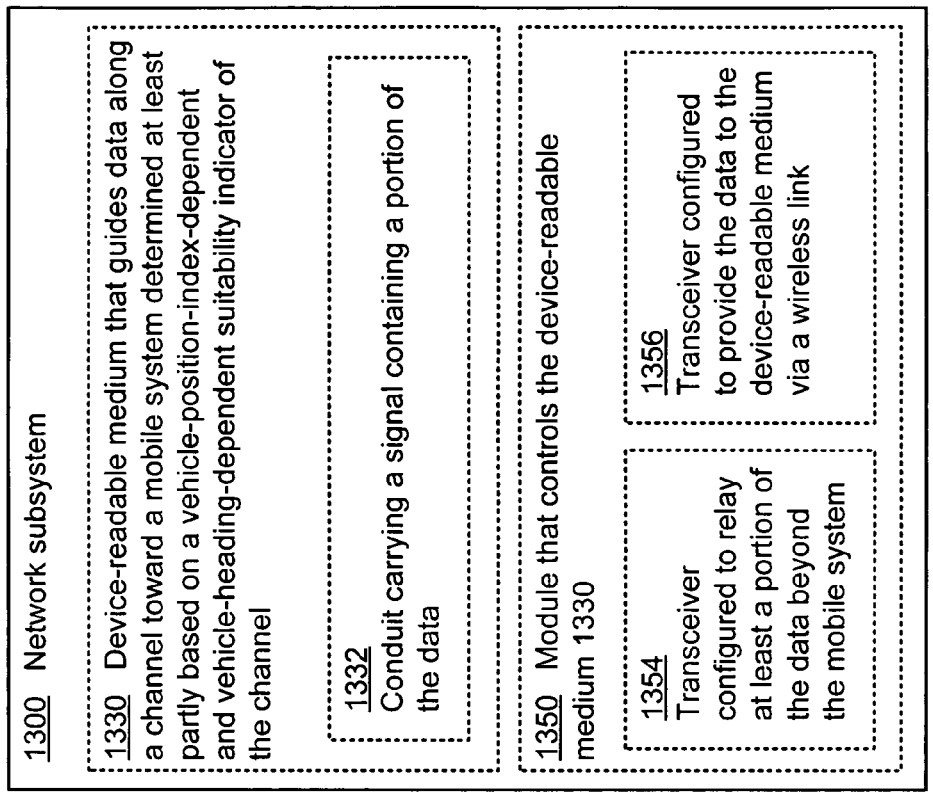
FIG. 13 illustrates a network subsystem that can include a device-readable medium and a module that controls it.

Referring now to FIG. 13, there is shown a network subsystem 1300 as an example embodiment that can include a device-readable medium 1330 and a module 1350. Device-readable medium 1330 guides data along a channel toward a mobile system determined at least partly based on a vehicle-position-index-dependent and vehicle-heading-dependent suitability indicator of (part or all of) the channel. Module 1350 controls the device-readable medium 1330.

Optionally, medium 1330 can include a conduit 1332 carrying a signal containing a portion of the data. For example, conduit 1332 can include a signal wire, a circuit board trace, an optical cable, or a bus.

Alternatively or additionally, module 1350 can include a transceiver 1354 configured to relay at least a portion of the data beyond the mobile system. For example, transceiver 1354 can be a circuit coupled to transmit by a directional or non-directional antenna to a next-downstream-node. Such an example is explained below with reference to FIG. 18.

Alternatively or additionally, module 1350 can include a transceiver 1356 configured to provide the data to the device-readable medium via a wireless link. Optionally, the same transceiver 1356 can also be configured to relay at least a portion of the data beyond the mobile system.

Figures 14, 15:
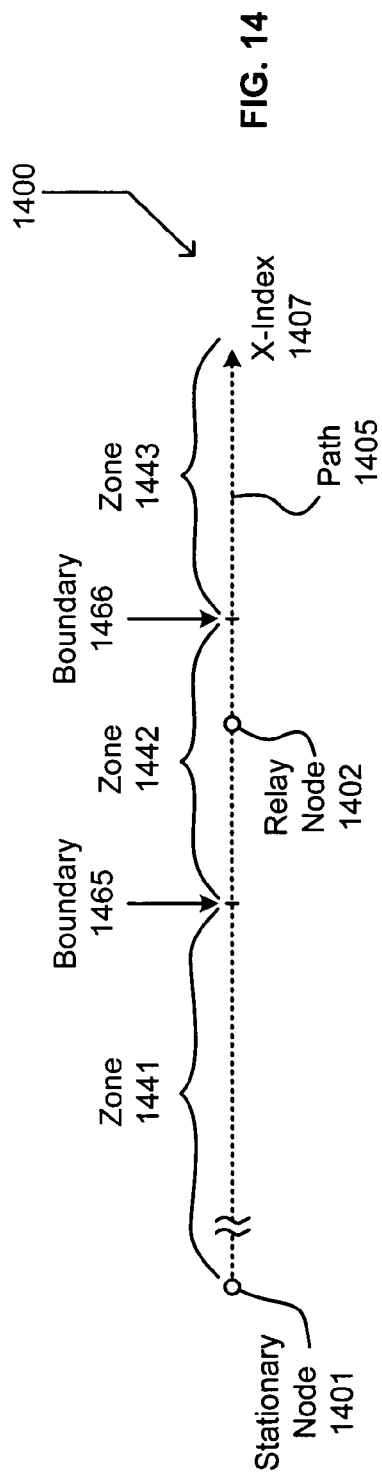
FIG. 14 illustrates a system having a stationary node and a relay node that can move between or within any of several zones.
FIG. 15 illustrates a digital suitability function for the system of FIG. 14.

Referring now to FIG. 14, there is shown an arrangement of a system 1400 of a stationary node 1401 and a relay node 1402 operable to transmit data to and/or from stationary node 1401. Zone boundary 1465 divides a marginal zone 1442 from a proximal zone 1441. Zone 1441 is proximal to stationary node 1401, as shown, and relay node 1402 has high connectivity to stationary node 1401 while relay node 1402 is within zone 1441.

Zone boundary 1466 separates marginal zone 1442 from distal zone 1443. Zone 1443 is distal to node 1401, and relay node 1402 generally has low or unreliable connectivity to stationary node 1401 while within relay node 1402 is within zone 1443. Connectivity is generally reliable but weaker in marginal zone 1442. Zone boundary 1465 and zone boundary 1466 are defined relative to an X-index 1407, which may be expressed in units of offset distance from stationary node 1401. Relay node 1402 is mobile relative to path 1405 and may remain within or move out of any of the zones 1441, 1442, 1443.

FIG. 15 defines a basic position-index-dependent and heading-dependent digital suitability function for the system 1400 of FIG. 14, expressed as a table 1500. The proximal zone 1441 corresponds to an X-index of 1, within which the suitability function result has a binary value of 11 for a relay node with a heading of zero (i.e. moving toward stationary node 1401). In fact, system 1400 (with table 1500) indicates that the suitability function result will always be 11 when relay node 1402 moves toward stationary node 1401, except when relay node 1402 is in distal zone 1443.

For relay node 1402 in proximal zone 1441 but moving away from stationary node 1401, system 1400 indicates that the suitability function result will be 10. For relay node 1402 in marginal zone 1441 and moving away from stationary node 1401, system 1400 indicate that the suitability function result will be 01. Optionally a router or controller initiates a re-routing operation in response to a suitability function result that decreases. Within distal zone 1443, the result is zero irrespective of heading.

It will be appreciated that system 1400 can be adapted to an application where node 1401 is a mobile node defining a frame of reference with zones that move with node 1401. Alternatively or additionally, system 1400 can be adapted so that the suitability indicator is speed independent in some of the zones. For example, if Node A is catching up to Node B as both travel eastward, the heading of Node B can be "moving toward" relative to Node A, leading to a prediction that they will become closer and more strongly coupled.

As a further example, stationary node 1401 can perform the operational flow 100 so as to incorporate operation 835 and operation 836 of FIG. 8. In the identifying operation 835, node 1401 identifies a boundary 1466 of a zone 1443 within which the suitability indicator is speed-independent. In the indicating operation, node 1401 indicates an estimated offset distance (X-index 1407) between the passenger vehicle (relay node 1402) and a device (node 1401) that is outside the passenger vehicle.

Figure 16:
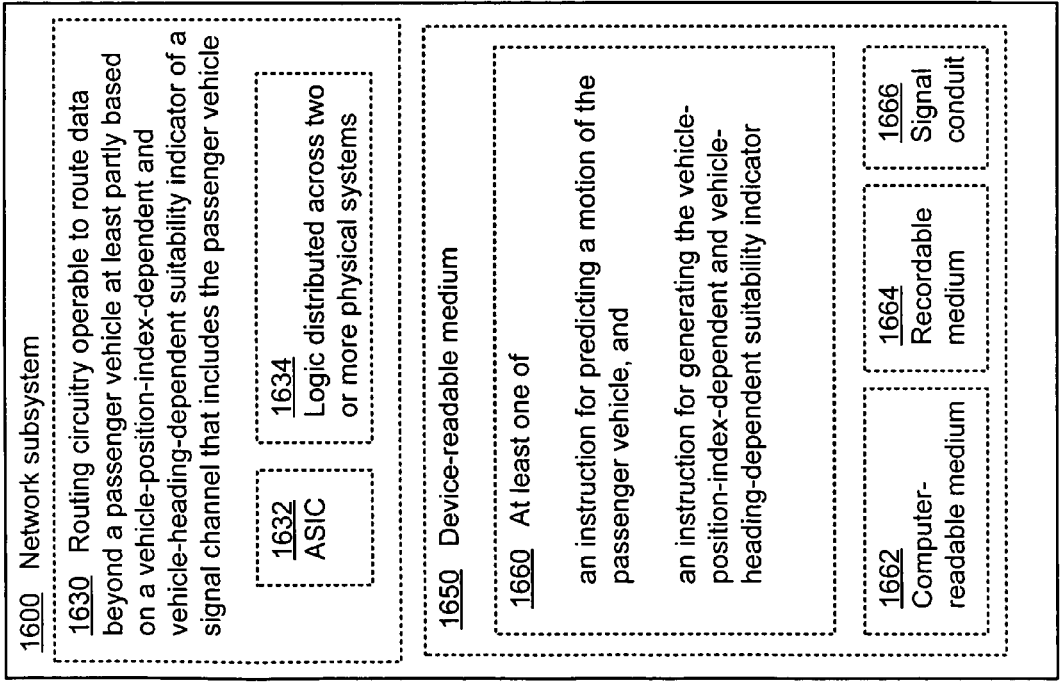
FIG. 16 illustrates a network subsystem that can include routing circuitry and a device-readable medium bearing one or more instructions.

Referring now to FIG. 16, there is shown a network subsystem 1600 as an example embodiment. Network subsystem 1600 comprises routing circuitry 1630 operable to route data beyond a passenger vehicle at least partly based on a vehicle-position-index-dependent and vehicle-heading-dependent suitability indicator of a signal channel that includes the passenger vehicle. Routing Circuitry 1630 optionally includes at least one of an application-specific integrated circuit 1632 or logic 1634 distributed across two or more physical system.

Routing circuitry 1630 as shown in FIG. 16 can optionally serve as part or all of controller 740 in a network subsystem such as those of FIG. 7. Alternatively, routing circuitry 1630 as shown in FIG. 16 can serve as router 1140 in a networks subsystem such as those of FIG. 11.

As shown in dashed block 1660, optionally, network subsystem 1600 may further include a device-readable medium bearing at least one of an instruction for predicting a motion of the passenger vehicle and an instruction for generating the vehicle-position-index-dependent and vehicle-heading-dependent suitability indicator 1660. Device-readable medium may further include at least one of a computer-readable medium 1662, a recordable medium 1664 for retrieving information, or a signal conduit 1666 for transmitting information.

In one alternative embodiment, a subsystem 710 of network 700 of FIG. 7 implements the above-described subsystem 1600 of FIG. 16. Controller 740 can include the routing circuitry 1630 and the device-readable medium 1650. Routing circuitry 1630 is operable to route data beyond a passenger vehicle (by routing the data to system 780, beyond vehicle 765, for example) at least partly based on a vehicle-position-index-dependent and vehicle-heading-dependent suitability indicator of a signal channel (channel 760, for example). Channel 760 includes the vehicle 765. Information is optionally gathered about one or more data channels (channels 750,760, for example) available for routing that include vehicle 765. Subsystem 1600 can perform the operational flow 100 of FIG. 1, for example, by using controller 740 to perform the determining operation 130 and to perform the transferring operation 150.

Figure 17:
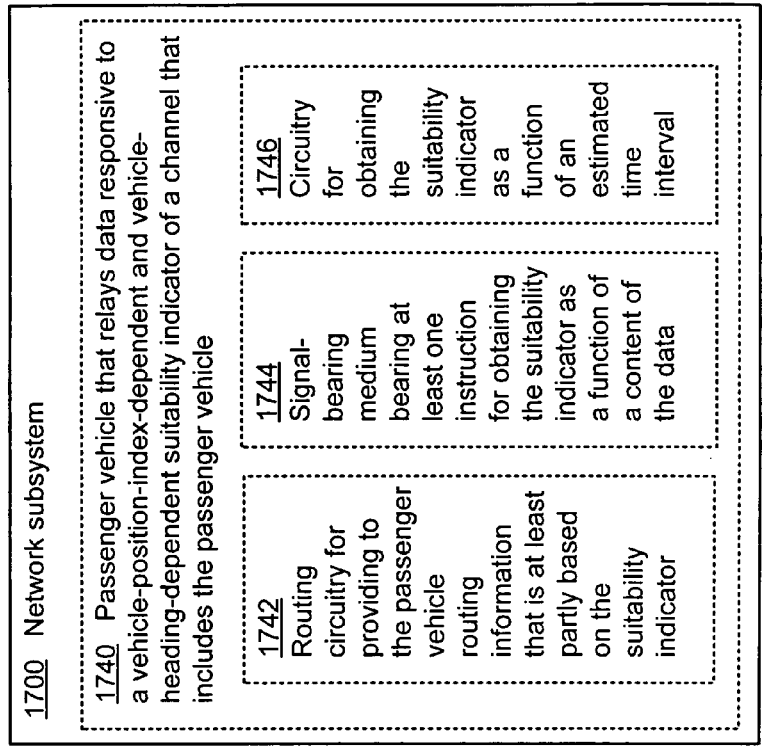
FIG. 17 illustrates embodiments of a network subsystem that can include a passenger vehicle.

Referring now to FIG. 17, there is shown a network subsystem 1700 as an example embodiment. Network subsystem 1700 comprises a passenger vehicle 1740 that relays data responsive to a vehicle-position-index-dependent and vehicle-heading-dependent suitability indicator of a channel that includes the passenger vehicle. Passenger vehicle 1740 includes at least one of routing circuitry 1742, a signal-bearing medium 1744, or special-purpose circuitry 1746. Routing circuitry 1742 is configured for providing to the passenger vehicle routing information that is at least partly based on the suitability indicator.

Signal-bearing medium 1744 bears at least one instruction for obtaining the suitability indicator as a function of a content of the data. For example, a suitability function can depend on whether the data contains intelligible data, or a portion of a computer virus, or an error.

Circuitry 1746 is adapted to obtain the suitability indicator as a function of an estimated time interval. For example, the time interval may approximate how long passenger vehicle 1740 took to pass between two positions.

Figure 18:
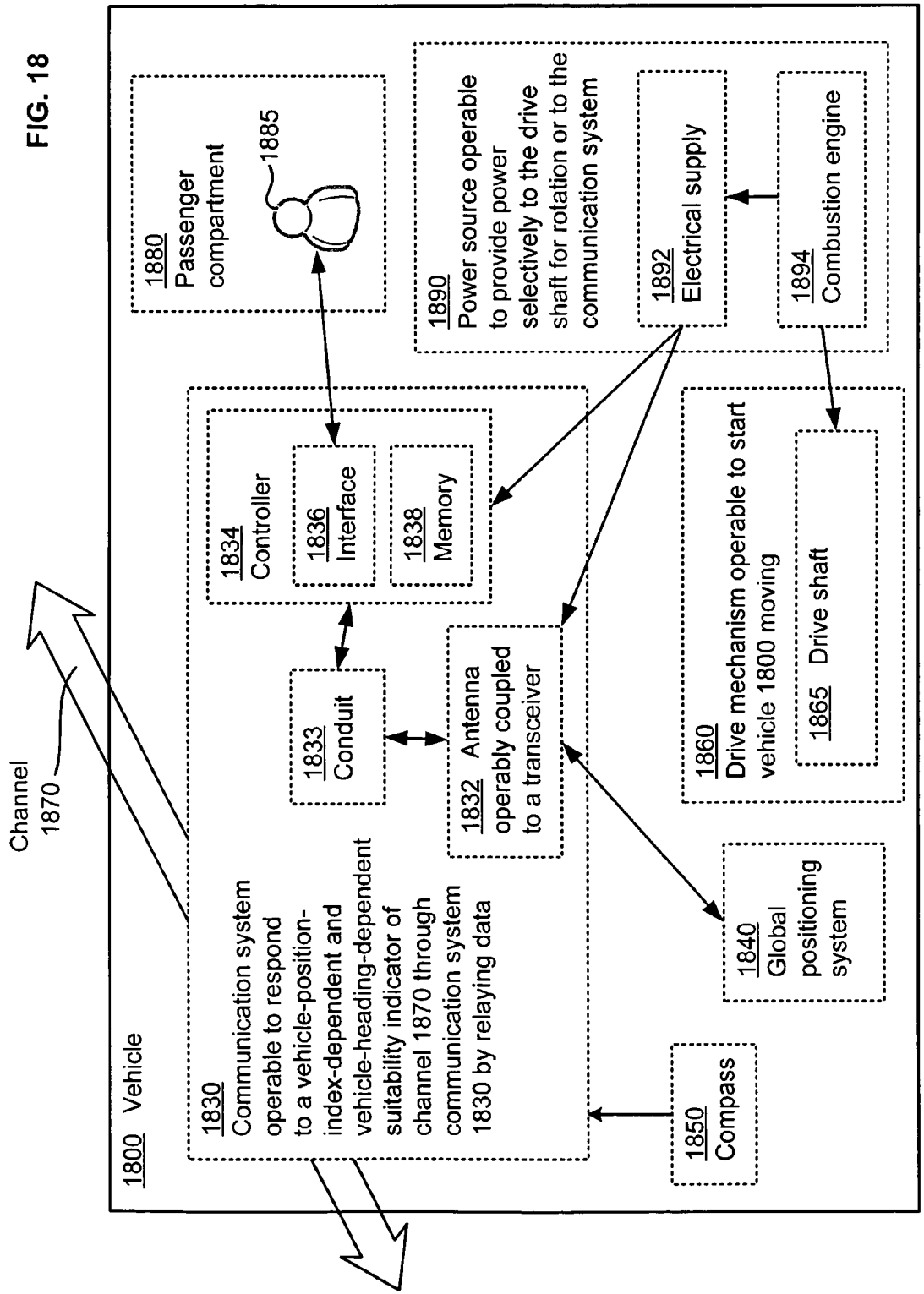
FIG. 18 illustrates embodiments of a passenger vehicle having a communication system through which a communication channel is routed.

Referring now to FIG. 18, there is shown a vehicle 1800 as an example embodiment. Any of the above-described embodiments of passenger vehicle 1740 can optionally be implemented in vehicle 1800 as described below. Vehicle 1800 comprises at least one of a communication system 1830, a global positioning system 1840, a compass 1850, a drive mechanism 1860 operable to start vehicle 1800 moving, a passenger compartment 1880, or a power source 1890. Optionally, vehicle 1830 contains fewer than all of these.

Drive mechanism 1860 is operable to start vehicle 1800 moving (i.e. from a stationary position). This can be accomplished, for example, by using a drive shaft 1865. Optionally, drive shaft 1865 can be operably coupled to one or more propellers or one or more axles of vehicle 1800.

Power source 1890 is operable to provide power selectively to the drive shaft 1865 or to the communication system 1830. Power source 1890 optionally includes a combustion engine 1894, a fuel cell, and/or an electrical supply 1892. In the specific example shown, the electrical supply 1892 can receive power from the combustion engine 1894 via an alternator of the electrical supply 1892.

A wireless communication channel 1870 can travel through vehicle 1800 via communication system 1830, a subsystem of vehicle 1800. Communication system 1830 can include a conduit 1833 operatively coupling an antenna 1832 to a controller 1834. Controller 1834 can include an interface 1836 and a memory 1838. Antenna 1832 is operably coupled to a transceiver. Conduit 1833 optionally implements signal conduit 1566 in an embodiment of network subsystem 1500 of FIG. 15. Alternatively, signal conduit 1833 can implement signal bearing medium 1744 of FIG. 17.

Global positioning system 1840 can operate to generate information that includes at least latitude and longitude. Compass 1850 can operate to provide directional information from which a heading can be obtained, for example, by combination with a speedometer reading. Passenger compartment 1880 can contain a user 1885 who can provide operating parameters or instructions or can receive information about heading, position, or information relating to channel 1870.

In one alternative embodiment, relay node 1402 of FIG. 14 is implemented as vehicle 1800 of FIG. 18. Relay node 1402 can include communication system 1830 operable to respond to a vehicle-position-index-dependent and vehicle-heading-dependent suitability indicator of a signal channel through the communication system 1830 by relaying data. Node 1402 can further include a drive mechanism 1860 operable to start the vehicle moving and a power source 1890 operable to provide power selectively to the communication system 1830 or to the drive mechanism 1860. Drive mechanism 1860 can include a drive shaft 1865. Power source 1890 can include an electrical supply 1892. Power source 1890 is optionally operable to provide power to the drive shaft 1865 and to an antenna 1832 simultaneously. Power source 1890 optionally receives a control input via interface 1836 from a passenger (user 1885, for example), the control input selectively directing power to drive shaft 1865 and/or to antenna 1832 from power source 1890. Node 1402 optionally includes a compass 1850 and a positioning system 1840 that is operable to generate information that includes at least latitude and longitude. Node 1402 optionally performs operational flow 900 of FIG. 9 in which the obtaining operation 930 includes receiving the routing information from stationary node 1401.

Figure 19:
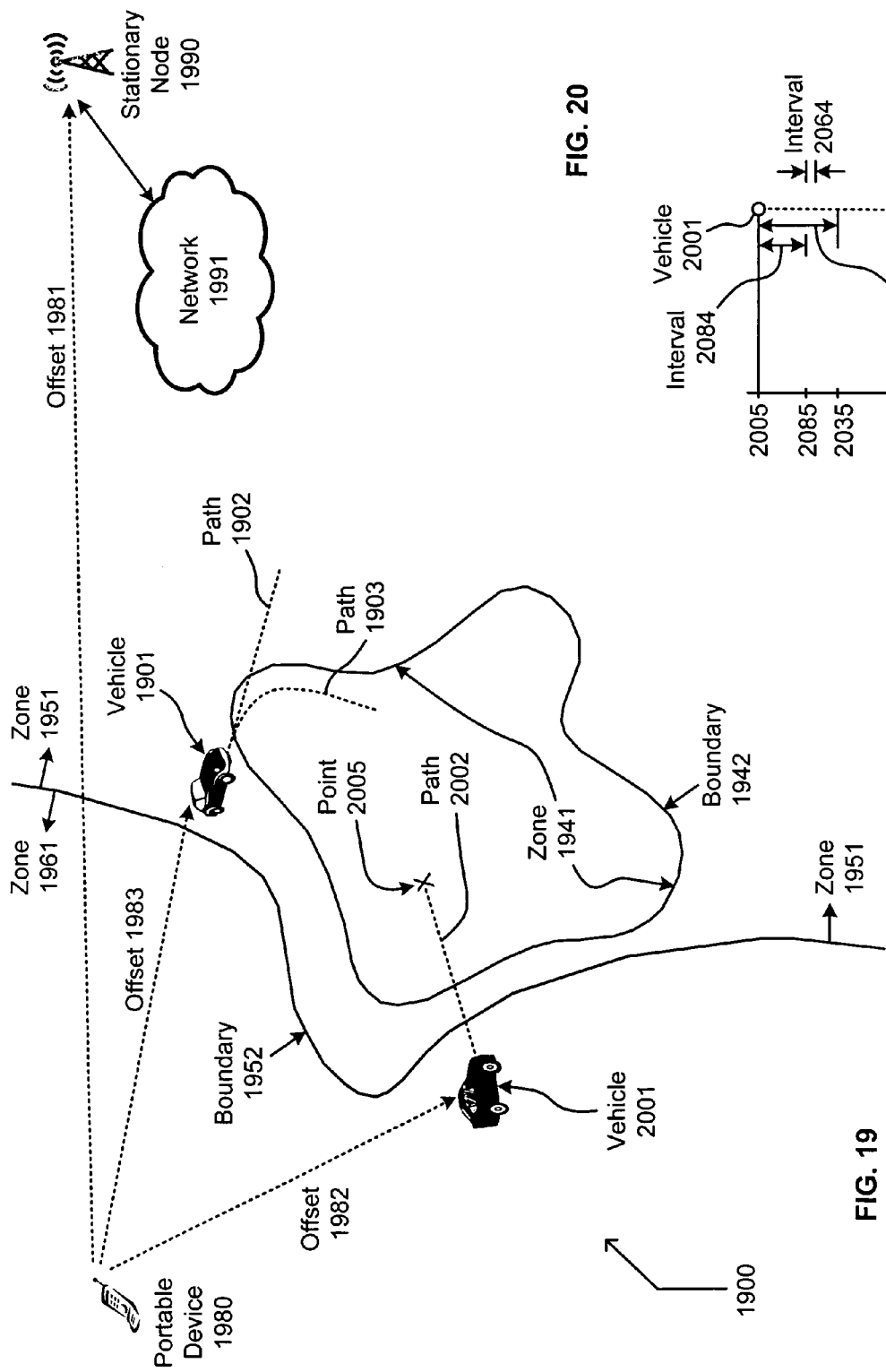
FIG. 19 illustrates a communication network including mobile devices for routing to a stationary node.

Referring now to FIG. 19, there is shown a system 1900 including a portable device 1980 having information to be routed to a stationary node 1990 in communication with a network 1991 such as the Internet. (FIG. 19 shows map positions and features accurately, but the objects shown are not to scale.) Rather than transmit all of the information wirelessly to stationary node 1990 directly over a large distance (such as offset 1981), a portable device might transmit over a shorter distance (such as offset 1983 or offset 1982). If a viable transmission distance that is at least 10% shorter can be identified, for example, even this can be a significant advantage.

At a given moment in time, according to an example operational flow, vehicle 1901 and vehicle 2001 are identified as candidates. Vehicle 1901 is traveling in an easterly direction along path 1902, a linear projection of vehicle 1901's current heading. Vehicle 1901 is currently in zone 1951, but is expected to cross boundary 1942 into zone 1941 shortly and remain there for an interval that can be estimated by reference to path 1902 and a current speed of vehicle 1901.

A better estimate of the interval can be obtained by using a model that estimates a route of vehicle 1901, such as by using a programmed route being provided to vehicle 1901 such as by on-board navigation, or at least by reference to roads that actually exist. (As of this writing, programmed routes that account for speed, such as a service available on mapquest.com, are more than sufficiently accurate for present purposes.) For example, if vehicle 1901 is modeled as following a curvilinear path 1903 at a constant speed, it will be predicted that vehicle 1901 will remain in zone 1941 for a longer interval than that of linear path 1902.

Portable device 1980 and vehicle 2001 are currently in zone 1961, as shown, a region within which adequate service is not available for the needs of portable device 1980. Along path 2002 at a predicted speed, however, vehicle 2001 is predicted to cross boundary 1952 and then boundary 1942 after specific intervals, each crossing causing a service level increase to vehicle 2001 and portable device 1980.

In some embodiments, a map can be used to obtain a one-dimensional heading and speed that is useful. In one operative example, vehicle 2001 is generally traveling in an easterly direction toward an estimated destination of point 2005. Vehicle 2001 performs flow 100 including operation 637. A direction along a line between vehicle 2001 and its estimated destination (along path 2002, in this example) is used as an estimated heading of vehicle 2001. An instantaneous heading and estimated speed of vehicle 2001 are compared to point 2005 to compute how fast a distance between vehicle 2001 and its destination is changing. This rate of change is used as a speed of vehicle 2001. By expressing a heading and speed of vehicle 2001 in this way, a useful estimate like "4 meters per second east-by-northeast" can be distilled and used, for example, even for where a predicted 2-dimensional route is not known with adequate confidence.

Alternatively characterized, system 1900 can be a network subsystem that includes a sender (portable device 1980, vehicle 2001, or network 1991, for example) and a mobile system (vehicle 1901, for example). Optionally both are implemented as vehicle 1800 of FIG. 18. The sender transmits data through the mobile system at least partly based on a heading-dependent suitability indicator of a channel that includes the mobile system. Vehicle 1901 optionally includes one or more antennas 1832 for detecting its position, for example, and/or for receiving a property of at least some of the data from the sender. Alternatively or additionally, vehicle 1901 can include interface 1836 for communicating with a user aboard vehicle 1901. For example, interface 1836 can be configured to query the user to obtain a property of at least some of the data.

Figure 20:
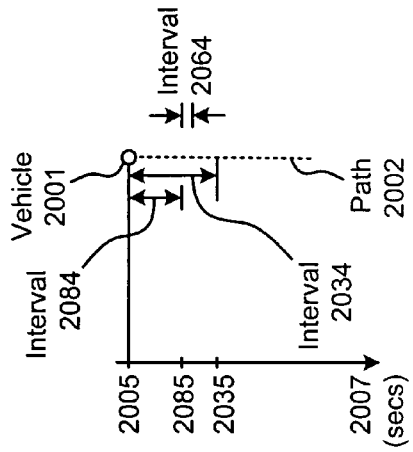
FIG. 20 illustrates intervals of interest in relation to the system of FIG. 19.

FIG. 20 shows intervals of interest in relation to the system 1900 of FIG. 19. Time scale 2007 is expressed in seconds relative to present moment 2005. Vehicle 2001 travels along curvilinear path 2002. After time interval 2084, at time 2085, vehicle 2001 is predicted to cross boundary 1952 into zone 1951. After time interval 2034, at time 2035, vehicle 2001 is predicted to cross boundary 1942 into zone 1941. If the transmission or connection time that is needed by portable device 1980 is expected to be short, such as estimated interval 2064, then a transmission or connection scheduling can proceed even before vehicle 2001 enters zone 1951.

Figure 21:
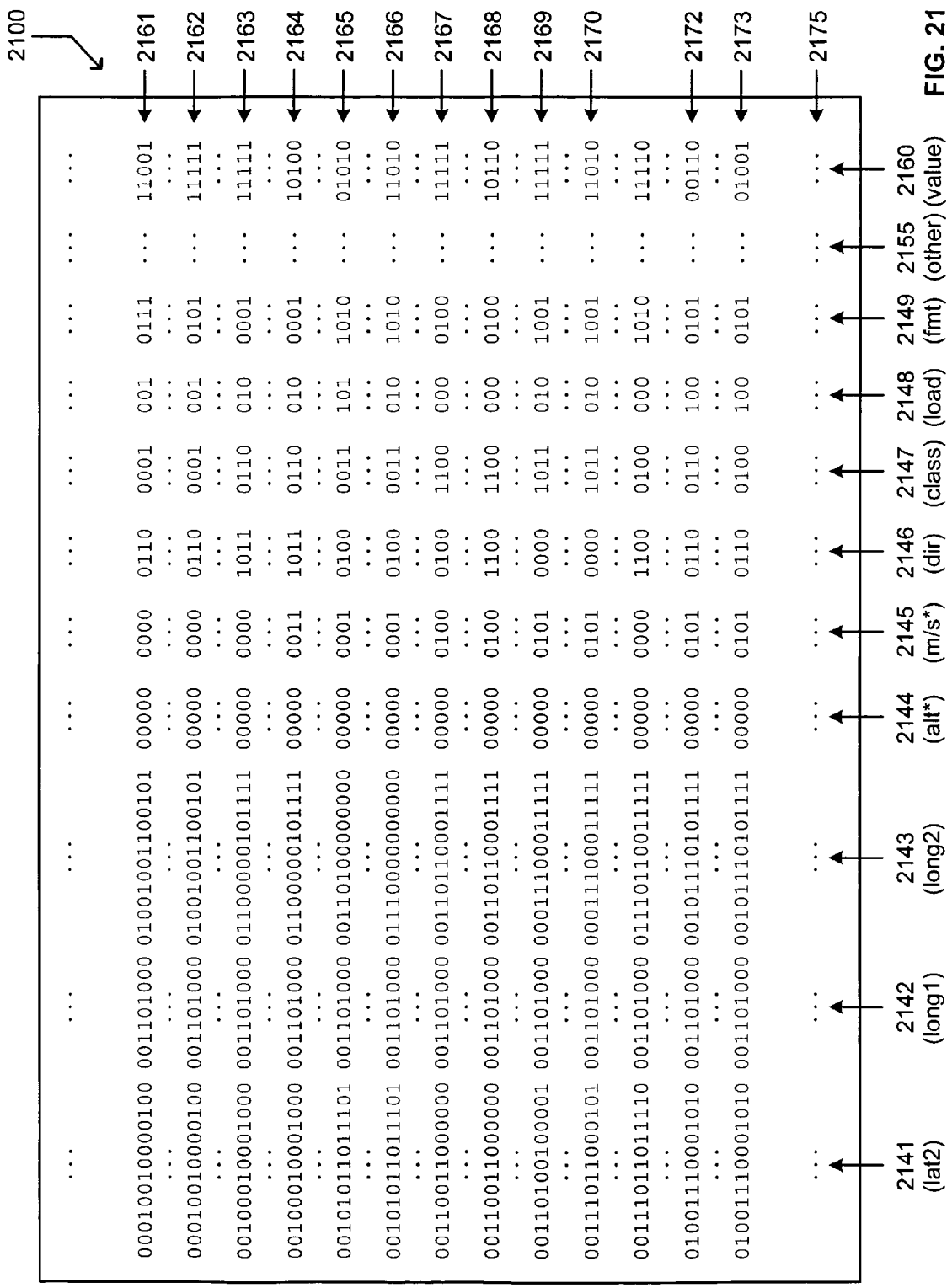
FIG. 21 illustrates a look-up table that can be used for determining a suitability value based on several operands.

Turning now to FIG. 21, there is shown a look-up table 2100 that can be used for determining a suitability value 2160 at least partly based on each of several operands including operand 2141 through operand 2149. In the network subsystem 1500 of FIG. 15, for example, table 2100 can be stored in recordable medium 1564 and accessed as needed by a processor executing instructions of element 1560. Alternatively, part or all of the logic of table 2100 can be implemented as software instructions stored in recordable medium 1564 and executed by the processor of subsystem 1500 to perform operational flow 100.

Operand 2141 is (a fractional-degree portion of) a latitude coordinate. Operand 2142 is (a whole-degree portion of) a longitude coordinate. Operand 2143 is (a fractional-degree portion of) a longitude coordinate complementing operand 2141. Operand 2144 is an altitude expressed in meters relative to ground or sea level, providing for altitude-dependent suitability indicators of aircraft that are passenger vehicles. Operand 2145 is a speed of a passenger vehicle, relative or absolute, expressed in meters per second. Operand 2144 and operand 2145 are marked with asterisks to indicate an exponential scale in which each binary number is taken to be a power of 2. For the operand vector of row 2173, for example, the indicated altitude is approximately 2 to the power of 0 (=1) meter above ground and the indicated speed is approximately 2 to the power of 6=64 meters per second.

Operand 2146 is a node heading in which (magnetic) North=0000 and the other compass points increase clockwise to 1111 (NNW). Operand 2146 is ignored, however, for rows in which operand 2145=0000. (In effect, speeds of 1 meter per second or less are treated as being stationary, in this model.)

Operand 2149 is an information format indicator, which can be encoded to indicate video, audio, proprietary, encoded, or any of the other format-indicative descriptors used in this document as a matter of design choice in light of present teachings. Additional operands 2155 can also be used in determining suitability value 2160.

Referring now to FIG. 22 in light of FIG. 21, FIG. 22 shows a map 2200 plotting latitude 2241 against longitude 2243. A location of each of node 2261 through node 2273 is also plotted on map 2200, some or all of which are suitable for relaying information. Node 2261 is shown at 39.070 degrees North, 104.287 degrees West, for example, in this detailed illustration. Referring again to FIG. 21, row 2161 corresponds to operands that describe node 2261. Node 2261 is therefore essentially stationary, as indicated by the 0000 in column 2145.

Row 2162 is identical to row 2161 except for the data format (at column 2149) and the suitability value (at column 2160). Row 2161 has a suitability value of 11001, a binary number that indicates a high suitability. Row 2162 indicates an even higher suitability, though, illustrating that the model implemented in table 2100 has a format-dependent suitability indicator at column 2160.

Row 2163 of FIG. 21 corresponds to operands that describe node 2263 of FIG. 22. Row 2163 and row 2164 illustrate that the model implemented in table 2100 has a speed-dependent suitability indicator (in column 2160), having operand values that are identical except for speed (in column 2145). Therefore the suitability indicator of node 2263 would decrease (from 11111 to 10100, according to table 2100) if the speed of node 2263 were about 8 meters per second rather than being at most about 1 meter per second.

Row 2165 of FIG. 21 corresponds to operands that describe node 2265 of FIG. 22. Operand 2148 is a binary load indicator such that 000 indicates no loading and 111 indicates saturation, in terms of a fractional usage of a critical resource such as a maximum data transfer rate and/or a reduction of available space in a memory such as memory 1838 in the embodiment of FIG. 18 described above. Row 2165 and row 2166 illustrate that the model implemented in table 2100 has a load-dependent suitability indicator, having operands that are identical except for load (in column 2148). Therefore the suitability indicator of node 2265 would increase (from 01010 to 11010, according to table 2100) if the load indicator of node 2265 were 010 rather than being 101.

Row 2168 of FIG. 21 corresponds to operands that describe node 2268 of FIG. 22. Row 2167 and row 2168 illustrate that the model implemented in table 2100 has a heading-dependent suitability indicator (in column 2160), having operand values that are identical except for heading (in column 2146). Therefore the suitability indicator of node 2268 would increase (from 10110 to 11111, according to table 2100) if the heading of node 2268 were eastward (dir=0100) rather than westward (dir=1100).

Rows 2169 & 2170 of FIG. 21 correspond respectively to operands that describe nodes 2269 & 2270 of FIG. 22. Rows 2169 & 2170 illustrate that the model implemented in table 2100 has a position-index-dependent suitability indicator (in column 2160), having operand values that are identical except for latitude (in column 2141). Node 2269 and node 2270 are both traveling north at about 32 m/s. The suitability indicator of node 2269 is higher than that of node 2270, according to table 2100, just because it is not as far north.

Row 2173 of FIG. 21 corresponds to operands that describe node 2273 of FIG. 22. Operand 2147 is a node class indicator corresponding to attributes of a given node that affect its ability to provide service. Operand 2147 can indicate some combination of a nominal antenna range, a nominal transmitter power, a nominal bandwidth, a nominal gain-bandwidth product, a nominal data rate, a wireless protocol, a service provider, or a service level, for example. In one implementation, operand 2147=0011 uniquely indicates a combination of node attributes that include a nominal operating frequency of 900 MHz and/or 1,800 MHz and an unlimited-duration service. Other values of operand 2147 shown indicate no such nominal operating frequency and/or limited-duration service, for example, when table 2100 is used in the above-described flows such as flow 900 of FIGS. 9 & 10.

Row 2172 and row 2173 illustrate that the model implemented in table 2100 has a load-dependent suitability indicator, having operand values that are identical except for node class (in column 2147). Therefore the suitability indicator of node 2273 would decrease (from 01001 to 00110, according to table 2100) if the class of node 2273 were 0110 rather than being 0100.

Additional rows 2175 are too numerous to be shown effectively on paper. Table 2100 is large, in fact, and in some contexts it would be convenient to use a simpler model. One way to do this would be to implement a table in a stationary router for a given area of land, and to use a local model that assumes a local value of one or more position indices (by omitting column 2142 and/or column 2145, for example). Part of the model could be executed before looking up the suitability value, alternatively or additionally, such as by using the heading and speed to predict a location at a future point in time. By using a suitability indicator that has been computed in stages, for example, the heading or speed operands could be removed from the look-up operation.

Referring again to the map 2200 of FIG. 22, an example operational flow is described with reference to node 2260, which is in a channel that needs to be defined. To find a next-downstream-node, node 2260 executes operation 635 and operation 636 of FIG. 6. Node 2260 polls several nodes within its transmission zone 2280, including nodes 2261-2273. At least one of the polled nodes is a passenger vehicle from which node 2260 receives a response per operation 636. In lieu of a look-up operation, though, node 2260 can perform the determining operation 130 by applying one or more criteria to a received value of load. For example, a load value above a predetermined threshold of 100 can be applied as a threshold above which a given node is deemed too busy for effective, reliable transmission. (Among the nodes 2261-2273 in the example of FIG. 22, only node 2265 will be deemed too busy by this criterion, as shown in column 2148 of FIG. 21.) This example operational flow illustrates how a coarse burden indicator like node load can be used.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various tools by which processes and/or systems and/or other technologies described herein can be effected (e.g., hardware, software, and/or firmware), and that the preferred tool set used will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible tools by which the processes and/or devices and/or other technologies described herein may be effected, none of which is inherently superior to the other in that any tool to be utilized is a choice dependent upon the context in which the tool will be deployed and the specific concerns (e.g., speed, flexibility, or predictability) of the implementer, any of which may vary. For example, those skilled in the art will recognize that optical communication links will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interactable and/or logically interacting components.

While certain features of the described implementations have been illustrated as disclosed herein, many modifications, substitutions, changes and equivalents will now occur to those skilled in the art. It is, therefore, to be understood that the appended claims are intended to cover all such modifications and changes as falling within the true spirit of the embodiments of the invention.

What is claimed is:

1. A machine, comprising:
    circuitry for determining a channel including at least one vehicle, at least partly based on at least position, speed, and heading of the at least one vehicle;
    circuitry for streaming at least a portion of at least one data stream toward at least one destination via the determined channel including at least one vehicle;
    circuitry for determining at least one boundary of at least one zone, the at least one zone associated with at least one maximum data transfer rate insufficient to sustain the at least one data stream;
    circuitry for comparing at least one location of at least one vehicle of the determined channel with the determined at least one boundary; and
    circuitry for, if the at least one vehicle is within at least one proximity of the determined boundary of at least one zone, altering at least one suitability indicator related to the at least one vehicle.

2. The machine of claim 1, wherein circuitry for determining a channel including at least one vehicle at least partly based on at least position, speed, and heading of the at least one vehicle comprises:
    circuitry for predicting at least one motion of the at least one vehicle, including at least predicting at least one time at which the at least one vehicle is predicted to reach a service zone boundary.

3. The machine of claim 1, wherein circuitry for determining a channel including at least one vehicle at least partly based on at least position, speed, and heading of the at least one vehicle comprises:
    circuitry for calculating at least one suitability indicator of a channel including at least one vehicle as a function of at least one estimated destination of the at least one vehicle at least partly based on at least some data provided by at least one on-board navigation system of the at least one vehicle, the at least one on-board navigation system providing at least one route to at least one destination.

4. The machine of claim 1, wherein circuitry for determining a channel including at least one vehicle at least partly based on at least position, speed, and heading of the at least one vehicle comprises:
    circuitry for obtaining at least one suitability indicator of a channel including at least one vehicle as a function of a capacity of at least one resource within the at least one vehicle, the capacity including a maximum available data transfer rate of at least one transmitter within the at least one vehicle.

5. The machine of claim 1, wherein circuitry for determining a channel including at least one vehicle at least partly based on at least position, speed, and heading of the at least one vehicle comprises:
    circuitry for obtaining at least one suitability indicator of a channel including at least one vehicle as a function of a format of at least one data stream.

6. The machine of claim 1, wherein circuitry for determining a channel including at least one vehicle at least partly based on at least position, speed, and heading of the at least one vehicle comprises:
    circuitry for obtaining at least one suitability indicator of a channel including at least one vehicle as a function of a message content of the at least one data stream.

7. The machine of claim 1, wherein circuitry for determining a channel including at least one vehicle at least partly based on at least position, speed, and heading of the at least one vehicle comprises:

circuitry for determining at least one suitability indicator of a channel including at least one vehicle as a function of an estimated size of a portion of the at least one data stream.

8. The machine of claim 1, wherein circuitry for determining a channel including at least one vehicle at least partly based on at least position, speed, and heading of the at least one vehicle comprises:
   circuitry for generating a yes-or-no suitability decision as a suitability indicator of a channel including at least one vehicle.

9. The machine of claim 1, wherein circuitry for determining a channel including at least one vehicle at least partly based on at least position, speed, and heading of the at least one vehicle comprises:
   circuitry for obtaining an indication of at least one location of at least one portable device that is outside the at least one vehicle.

10. The machine of claim 1, wherein circuitry for determining a channel including at least one vehicle at least partly based on at least position, speed, and heading of the at least one vehicle comprises:
    circuitry for indicating at least one estimated offset distance between the at least one vehicle and at least one device that is outside the at least one vehicle.

11. The machine of claim 1, wherein circuitry for streaming at least a portion of at least one data stream toward at least one destination via the determined channel including at least one vehicle comprises:
    circuitry for receiving at least one acknowledgment from the at least one vehicle.

12. The machine of claim 1, wherein circuitry for streaming at least a portion of the at least one data stream toward at least one destination via the determined channel including at least one vehicle comprises:
    circuitry for receiving from the determined channel at least one signal that includes at least one suitability indicator of the determined channel.

13. The machine of claim 1, wherein circuitry for streaming at least a portion of the at least one data stream toward at least one destination via the determined channel including at least one vehicle comprises:
    circuitry for generating routing information indicating the determined channel at least partly based on at least one suitability indicator of the determined channel.

14. The machine of claim 1, wherein circuitry for streaming at least a portion of at least one data stream toward at least one destination via the determined channel including at least one vehicle comprises:
    circuitry for streaming at least a portion of the at least one data stream; and
    circuitry for transmitting at least some non-streamed data associated with the at least one data stream, the non-streamed data including at least one indicator of at least one format of the at least one data stream.

15. The machine of claim 1, wherein circuitry for streaming at least a portion of at least one data stream toward at least one destination via the determined channel including at least one vehicle comprises:
    circuitry for establishing at least one bidirectional communication link spanning from a first node to a second node via the determined channel, the at least one bidirectional communication link including at least one data stream from the first node to the second node and at least one data stream from the second node to the first node.

16. The machine of claim 15, wherein circuitry for establishing at least one bidirectional communication link spanning from a first node to a second node via the determined channel, the at least one bidirectional communication link including at least one data stream from the first node to the second node and at least one data stream from the second node to the first node comprises:
    circuitry for establishing at least one bidirectional video call between an entity associated with the first node and an entity associated with the second node via the determined channel.

17. The machine of claim 1, wherein circuitry for streaming at least a portion of at least one data stream toward at least one destination via the determined channel including at least one vehicle comprises:
    circuitry for sending information within the at least one data stream downstream through at least one other vehicle.

18. The machine of claim 1, wherein circuitry for streaming at least a portion of the at least one data stream toward at least one destination via the determined channel including at least one vehicle comprises:
    circuitry for broadcasting at least a portion of the at least one data stream to one or more other destination nodes.

19. The machine of claim 1, wherein circuitry for streaming at least a portion of at least one data stream toward at least one destination via the determined channel including at least one vehicle comprises:
    circuitry for including at least one video clip within the at least one data stream.

20. The machine of claim 1, wherein circuitry for streaming at least a portion of at least one data stream toward at least one destination via the determined channel including at least one vehicle comprises:
    circuitry for including at least one audio message within the at least one data stream.

21. The machine of claim 1, wherein circuitry for streaming at least a portion of the at least one data stream toward at least one destination via the determined channel including at least one vehicle comprises:
    circuitry for streaming at least a portion of the at least one data stream from the at least one vehicle to a node by a protocol that depends upon a value representative of a heading of the at least one vehicle relative to the node, including at least selecting at least one wireless operating frequency for streaming the at least a portion of the at least one data stream at least partly based on the value representative of the heading.

22. The machine of claim 1, wherein circuitry for determining a channel including at least one vehicle at least partly based on at least position, speed, and heading of the at least one vehicle comprises:
    circuitry for obtaining at least one suitability indicator of a channel including at least one vehicle at least partly based on at least one predicted path of the at least one vehicle at least partly based on input from at least one camera.

23. The machine of claim 1, wherein circuitry for determining a channel including at least one vehicle at least partly based on at least position, speed, and heading of the at least one vehicle comprises:
    circuitry for obtaining at least one suitability indicator of a channel including at least one vehicle at least partly based on at least one first suitability indicator dependent on at least one position of the at least one vehicle and at least partly based on at least one second suitability indicator dependent on at least one heading of the at least one vehicle.

24. The machine of claim 1, wherein circuitry for determining a channel including at least one vehicle at least partly based on at least position, speed, and heading of the at least one vehicle comprises:
    circuitry for determining a channel including at least one vehicle at least partly based on at least one received indication related to the at least one data stream.

25. The machine of claim 1, wherein circuitry for determining a channel including at least one vehicle at least partly based on at least position, speed, and heading of the at least one vehicle comprises:
    circuitry for determining a channel including at least one vehicle at least partly based on at least one received indication related to the at least one data stream including at least one received indication of at least one bit-error rate required for streaming the at least one data stream.

26. The machine of claim 1, wherein circuitry for determining a channel including at least one vehicle at least partly based on at least position, speed, and heading of the at least one vehicle comprises:
    circuitry for determining the channel including at least one vehicle at least partly based on at least one vehicle suitability indicator being dependent upon at least one maximum data transfer rate associated with at least one vehicle and at least one determination that the at least one maximum data transfer rate exceeds at least one rate required for streaming the at least one data stream.

27. The machine of claim 1, wherein circuitry for, if the at least one vehicle is within at least one proximity of the determined boundary of at least one zone, altering at least one suitability indicator related to the at least one vehicle comprises:
    circuitry for determining whether the at least one data stream can be completely streamed via the determined channel at least partly based on at least one received size of the at least one data stream and at least one predicted motion of the at least one vehicle.

28. The machine of claim 27, further comprising:
    circuitry for altering at least one suitability indicator related to the at least one vehicle at least partly based on the determining whether the at least one data stream can be completely streamed via the determined channel.

29. The machine of claim 27, further comprising:
    circuitry for at least one of initiating at least one re-routing operation or determining at least another channel including at least another vehicle at least partly based on the determining whether the at least one data stream can be completely streamed via the determined channel.

30. The machine of claim 1, wherein circuitry for determining at least one boundary of at least one zone, the at least one zone associated with at least one maximum data transfer rate insufficient to sustain the at least one data stream comprises:
    circuitry for determining at least one boundary of at least one zone associated with a bit-error rate associated with streaming below at least one bit-error rate required for streaming the at least one data stream.

31. The machine of claim 1, wherein circuitry for determining a channel including at least one vehicle at least partly based on at least position, speed, and heading of the at least one vehicle comprises:
    circuitry for determining a channel including at least one mobile device at least partly based on at least position, speed, and heading of the at least one mobile device.

32. A method, comprising:
    determining a channel including at least one vehicle: at least partly based on at least position, speed, and heading of the at least one vehicle;
    streaming at least a portion of at least one data stream toward at least one destination via the determined channel including at least one vehicle;
    determining at least one boundary of at least one zone, the at least one zone associated with at least one maximum data transfer rate insufficient to sustain the at least one data stream;
    comparing at least one location of at least one vehicle of the determined channel with the determined at least one boundary; and
    if the at least one vehicle is within at least one proximity of the determined boundary of at least one zone, altering at least one suitability indicator related to the at least one vehicle.

33. A system, comprising:
    a computing device; and
    one or more instructions that, when executed on the computing device, cause the computing device to at least:
        determine a channel including at least one vehicle at least partly based on at least position, speed, and heading of the at least one vehicle;
        stream at least a portion of the at least one data stream toward at least one destination via the determined channel including at least one vehicle;
        determine at least one boundary of at least one zone, the at least one zone associated with at least one maximum data transfer rate insufficient to sustain the at least one data stream;
        compare at least one location of at least one vehicle of the determined channel with the determined at least one boundary; and
        if the at least one vehicle is within at least one proximity of the determined boundary of at least one zone, alter at least one suitability indicator related to the at least one vehicle.

34. A computer program product, comprising:
    at least one non-transitory computer-readable medium including at least:
        one or more instructions for determining a channel including at least one vehicle at least partly based on at least position, speed, and heading of the at least one vehicle;
        one or more instructions for streaming at least a portion of at least one data stream toward at least one destination via the determined channel including at least one vehicle;
        one or more instructions for determining at least one boundary of at least one zone, the at least one zone associated with at least one maximum data transfer rate insufficient to sustain the at least one data stream;
        one or more instructions for comparing at least one location of at least one vehicle of the determined channel with the determined at least one boundary; and
        one or more instructions for, if the at least one vehicle is within at least one proximity of the determined boundary of at least one zone, altering at least one suitability indicator related to the at least one vehicle.

35. A system, comprising:
    means for determining a channel including at least one vehicle at least partly based on at least position, speed, and heading of the at least one vehicle;

means for streaming at least a portion of at least one data stream toward at least one destination via the determined channel including at least one vehicle; and means for altering at least one suitability indicator related to at least one vehicle of the determined channel at least partly based on at least one determination related to the at least one vehicle of the determined channel exiting a zone associated with a minimum data transfer rate sufficient to sustain the at least one data stream.

36. The machine of claim 31, wherein circuitry for determining a channel including at least one mobile device at least partly based on at least position, speed, and heading of the at least one mobile device comprises:

circuitry for determining a channel including at least one transmitter associated with at least one vehicle at least partly based on at least position, speed, and heading of the at least one vehicle, the at least one vehicle including at least one of at least one passenger vehicle or at least one motor-propelled vehicle.

37. The machine of claim 1, wherein circuitry for streaming at least a portion of at least one data stream toward at least one destination via the determined channel including at least one vehicle comprises:

circuitry for streaming the at least a portion of the at least one data stream to the at least one destination, the at least one destination including the at least one vehicle.

38. The machine of claim 1, wherein circuitry for determining a channel including at least one vehicle at least partly based on at least position, speed, and heading of the at least one vehicle comprises:

circuitry for determining the at least one vehicle as the channel.

* * * * *